(12) United States Patent
Suzuki et al.

(10) Patent No.: US 9,188,789 B2
(45) Date of Patent: Nov. 17, 2015

(54) DISPLAY DEVICE AND ELECTRONIC APPARATUS

(71) Applicant: Japan Display Inc., Tokyo (JP)

(72) Inventors: Daichi Suzuki, Tokyo (JP); Toshinori Uehara, Tokyo (JP); Ai Koike, Tokyo (JP)

(73) Assignee: Japan Display Inc., Tokyo (JP)

( * ) Notice: Subject to any disclaimer, the term of this patent is extended or adjusted under 35 U.S.C. 154(b) by 137 days.

(21) Appl. No.: 14/221,923

(22) Filed: Mar. 21, 2014

(65) Prior Publication Data

US 2014/0293172 A1    Oct. 2, 2014

(30) Foreign Application Priority Data

Mar. 26, 2013 (JP) ................. 2013-063325

(51) Int. Cl.
*G02F 1/1335* (2006.01)
*G02B 27/22* (2006.01)
*H04N 13/04* (2006.01)
*G09G 3/00* (2006.01)
*G09G 3/36* (2006.01)

(52) U.S. Cl.
CPC ............ *G02B 27/2214* (2013.01); *G09G 3/003* (2013.01); *H04N 13/0409* (2013.01); *H04N 13/0422* (2013.01); *G02B 27/2264* (2013.01); *G09G 3/3614* (2013.01); *G09G 3/3655* (2013.01); *G09G 2300/0426* (2013.01); *G09G 2300/0434* (2013.01); *G09G 2380/10* (2013.01); *H04N 2013/0463* (2013.01)

(58) Field of Classification Search
CPC .................................................. G02B 27/2214
See application file for complete search history.

(56) References Cited

U.S. PATENT DOCUMENTS 7,907,223 B2    3/2011  Maeda
2007/0291172 A1*  12/2007  Kouzimoto et al. .... B60R 11/02
                                                              348/488

FOREIGN PATENT DOCUMENTS

JP          2008-064917          3/2008

* cited by examiner

*Primary Examiner* — Wen-Ying P Chen
(74) *Attorney, Agent, or Firm* — K&L Gates LLP

(57) ABSTRACT

A display device for displaying a first image in a first direction and a second image in a second direction, including a display panel having pixels arrayed in a matrix, a backlight configured to emit a light to a back surface of the display panel, and a parallax barrier configured so that a light from the first pixel passes through an opening of the parallax barrier and is emitted to the first direction, and a light from the second pixel passes through the opening of the parallax barrier and is emitted to the second direction. The formula $(B-A)/A \le 1$ is satisfied wherein A represents the luminance of the first image when the first image and the second image are black images, and B represents a luminance of the first image when the first image is a black image and the second image is a white image.

9 Claims, 25 Drawing Sheets

543 DISPLAY UNIT
542 KEYBOARD
541 MAIN UNIT

551 UPPER CASING
554 DISPLAY
552 LOWER CASING

DISPLAY DEVICE AND ELECTRONIC APPARATUS

CROSS REFERENCES TO RELATED APPLICATIONS

The present application claims priority to Japanese Priority Patent Application JP 2013-063325 filed in the Japan Patent Office on Mar. 26, 2013, the entire content of which is hereby incorporated by reference.

BACKGROUND

1. Field of the Invention

The present disclosure relates to a display device. The present disclosure also relates to an electronic apparatus provided with such a display device.

2. Description of the Related Art

In recent years, a car navigation device or the like mounted on a vehicle uses a multi-view display device that displays different images to plural users on a single screen. Such a multi-view display device can display a map image to a vehicle driver, and can also display a television image to a person other than the driver in the vehicle (passenger), for example.

As its related technique, Japanese Patent Application Laid-open No. 2008-64917 describes an electro-optical device capable of narrowing a range of a mixed region where a first image and a second image are mixed in a front direction, while maintaining a display luminance of the first image and a display luminance of the second image.

In multi-view display devices, there may be occurred a crosstalk which is an interference between the first image and the second image. Specifically, when a contrast between the first image and the second image becomes higher, the crosstalk is more likely to be occurred.

SUMMARY

It is an object of the present invention to at least partially solve the problems in the conventional technology.

There is disclosed a display device for displaying a first image in a first direction and a second image in a second direction different from the first direction. The display device includes a display panel having a plurality of pixels arrayed in a matrix, the plurality of pixels including a first pixel which is any one of pixels, a second pixel adjacent to the first pixel, a third pixel adjacent to the first pixel opposite from the second pixel, and a fourth pixel adjacent to the second pixel opposite from the first pixel, a backlight configured to emit a light to a back surface of the display panel, and a parallax barrier made of a light shielding material and formed on a front surface of the first pixel and the second pixel, the parallax barrier including an opening having no light shielding material at a boundary portion between the first pixel and the second pixel, the parallax barrier configured so that a light from the first pixel passes through the opening of the parallax barrier and is emitted to the first direction, and a light from the second pixel passes through the opening of the parallax barrier and is emitted to the second direction. At least part of a light emitted from the backlight and entered the boundary portion between the first pixel and the second pixel passes through the opening of the parallax barrier, at least part of a light emitted from the backlight and entered a boundary portion between the first pixel and the third pixel passes through the opening of the parallax barrier, and at least part of a light emitted from the backlight and entered a boundary portion between the second and the fourth pixel passes through the opening of the parallax barrier, so that a luminance of the first image when the first image and the second image are black images is increased to satisfy a following formula (1)

$$(B-A)/A \leq 1 \quad \text{Formula (1)}$$

wherein A represents the luminance of the first image when the first image and the second image are black images, and B represents a luminance of the first image when the first image is a black image and the second image is a white image.

There is disclosed an electronic apparatus including the aforementioned display device and a control unit to supply an input signal to the display device.

According to the display device and the electronic apparatus disclosed herein, crosstalk between images can be reduced.

The above and other objects, features, advantages and technical and industrial significance of this invention will be better understood by reading the following detailed description of presently preferred embodiments of the invention, when considered in connection with the accompanying drawings.

The following description is only for illustrative purpose. Any change, rearrangement, modification or the like readily derived from or substantially equivalent with the present disclosure without departing from the spirit and scope of the invention is encompassed within the present invention. For better understanding of the disclosure, the accompanying drawings may be schematic and not to scale with actual width, thickness, shapes of individual elements or components in actual embodiments. In any case, the accompanying drawings are for illustrative purpose only and not to be construed as any limitation of the present disclosure. In the following description and drawings, the corresponding elements or components in the plurality of drawings carry the identical numeric references, and the redundant explanation may be omitted as appropriate.

Additional features and advantages are described herein, and will be apparent from the following Detailed Description and the figures.

DETAILED DESCRIPTION

The present disclosure will now be described according to the following orders and with reference to the accompanying drawings:
1. General Configuration of Display Device;
2. First Embodiment;
3. Second Embodiment;
4. Application Examples (Electronic Apparatuses)

Examples where display devices according to the embodiments are applied to various electronic apparatuses; and
5. Configuration of Present Disclosure.

1. General Configuration of Display Device (Fundamental Configuration of Dual View Image Display Device)

Figure 1:
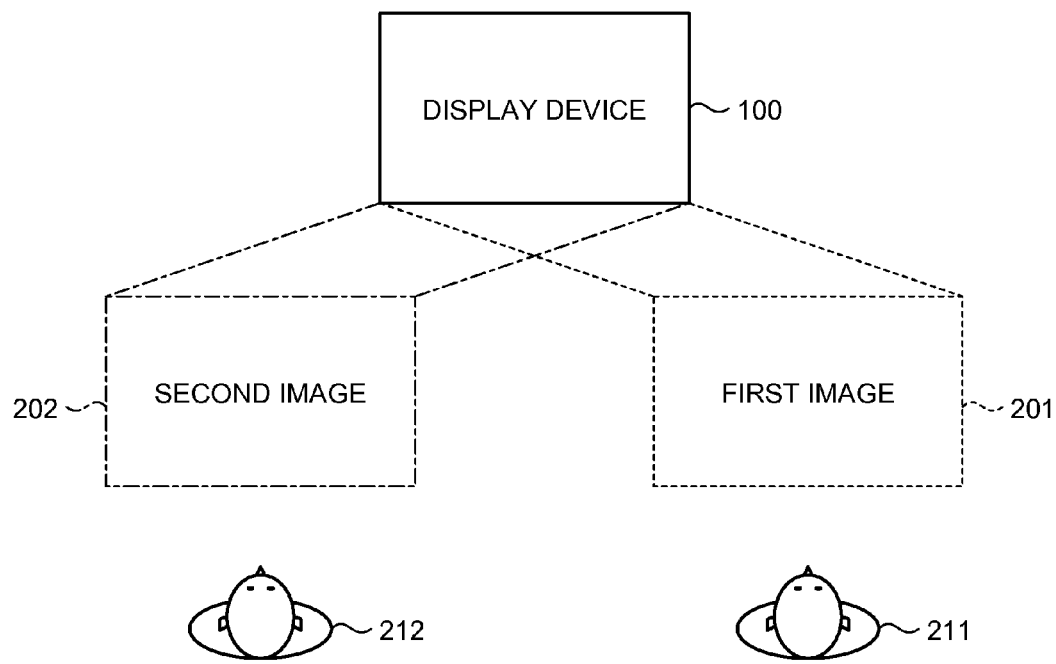
FIG. 1 is a schematic view conceptually illustrating a display device according to an embodiment of the present disclosure.

FIG. 1 is a schematic view conceptually illustrating a display device according to an embodiment of the present disclosure. A display device 100 displays a first image 201 in a first direction (a right side toward the display device 100) and displays a second image 202 in a second direction different from the first direction (a left side toward the display device 100), respectively. A first viewer 211 located on the first direction side relative to the display device 100 can view the first image 201. A second viewer 212 located on the second direction side relative to the display device 100 can view the second image 202. FIG. 1 conceptually illustrates that the first viewer 211 can view the first image 201 and the second viewer 212 can view the second image 202 substantially simultaneously over an entire display surface of the display device 100 respectively, depending on the relative positioning of the first and second viewers relative to the display device 100, in other words, depending on the viewing angle relative to the display device 100.

Figure 2:
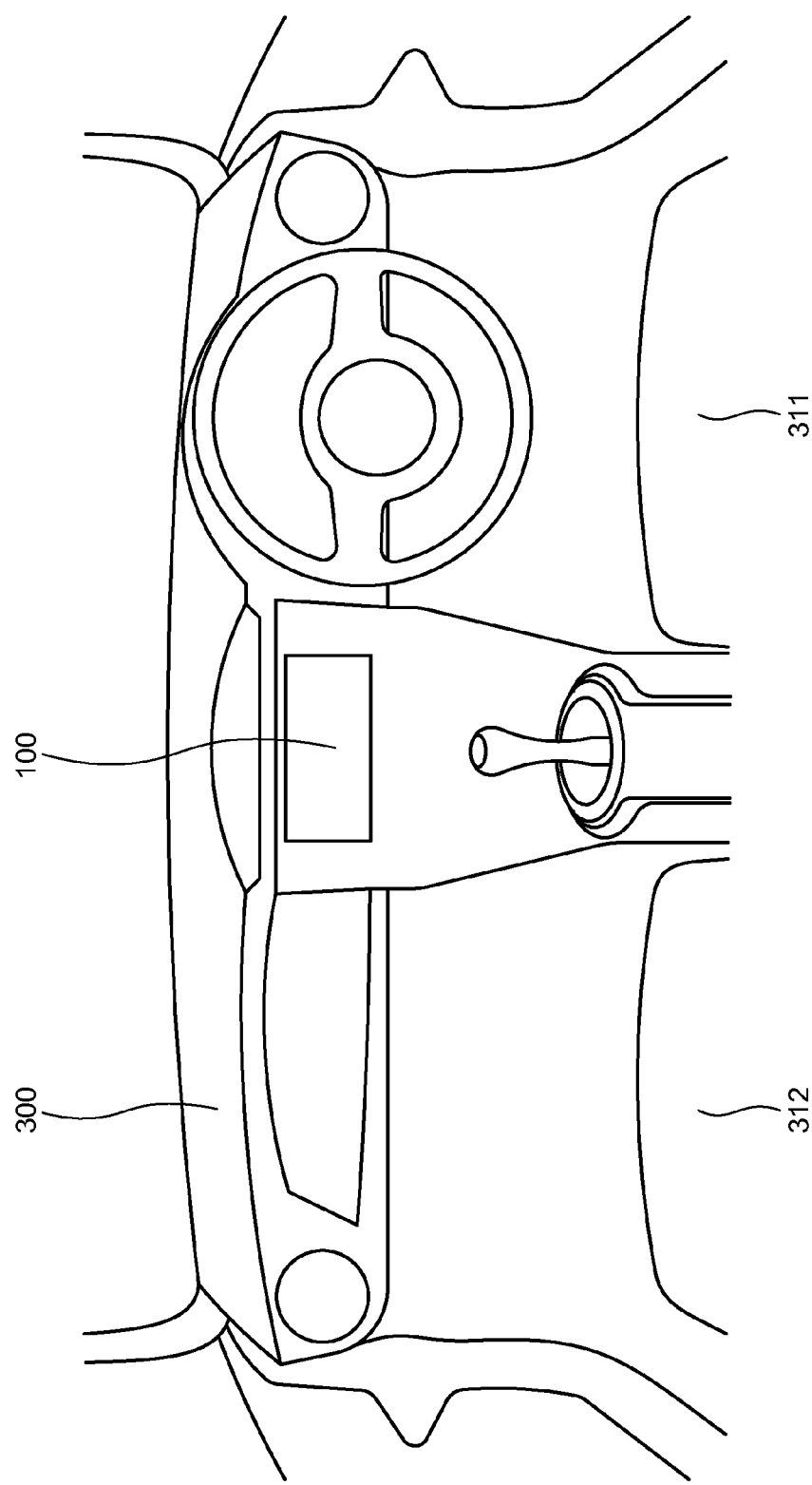
FIG. 2 is a schematic view illustrating an example of mounting the display device on a vehicle.

FIG. 2 is a schematic view illustrating an example of mounting the display device on a vehicle. The display device 100 may be disposed at a center position of a dashboard 300, for example, as illustrated in FIG. 2. The first viewer 211 be seated at a driver seat 311, and the second viewer 212 is seated at a front passenger seat 312. An image which can be viewed from the first direction relative to the display device 100 (the driver seat 311 side which is the right side toward the display device 100) may be a map or the like displayed by a car navigation system, for example. An image which can be viewed substantially simultaneously from the second direction (the front passenger seat 312 side which is the left side toward the display device 100) may be a television (TV) broadcast image or a DVD movie image, for example. Therefore, while the first viewer 211 (the driver) seated at the driver seat 311 enjoys the navigation assistance from the car navigation image, the second viewer 212 (the passenger) seated at the front passenger seat 312 enjoys the TV broadcast program or DVD movie substantially at the same time. Furthermore, each of the first and second images can be displayed on the entire screen (in full screen mode), which may be a 7 inch screen for example. Therefore, it is not necessary to display each image in a small sized section in split screen mode as in conventional multi-window display systems. In other words, information or contents optimized for each of the first viewer 211 (the driver) and the second viewer 212 (the passenger) can be provided for the first viewer 211 and the second viewer 212, respectively, as if multiple display devices are provided for respective viewers separately and independently.

Figure 3:
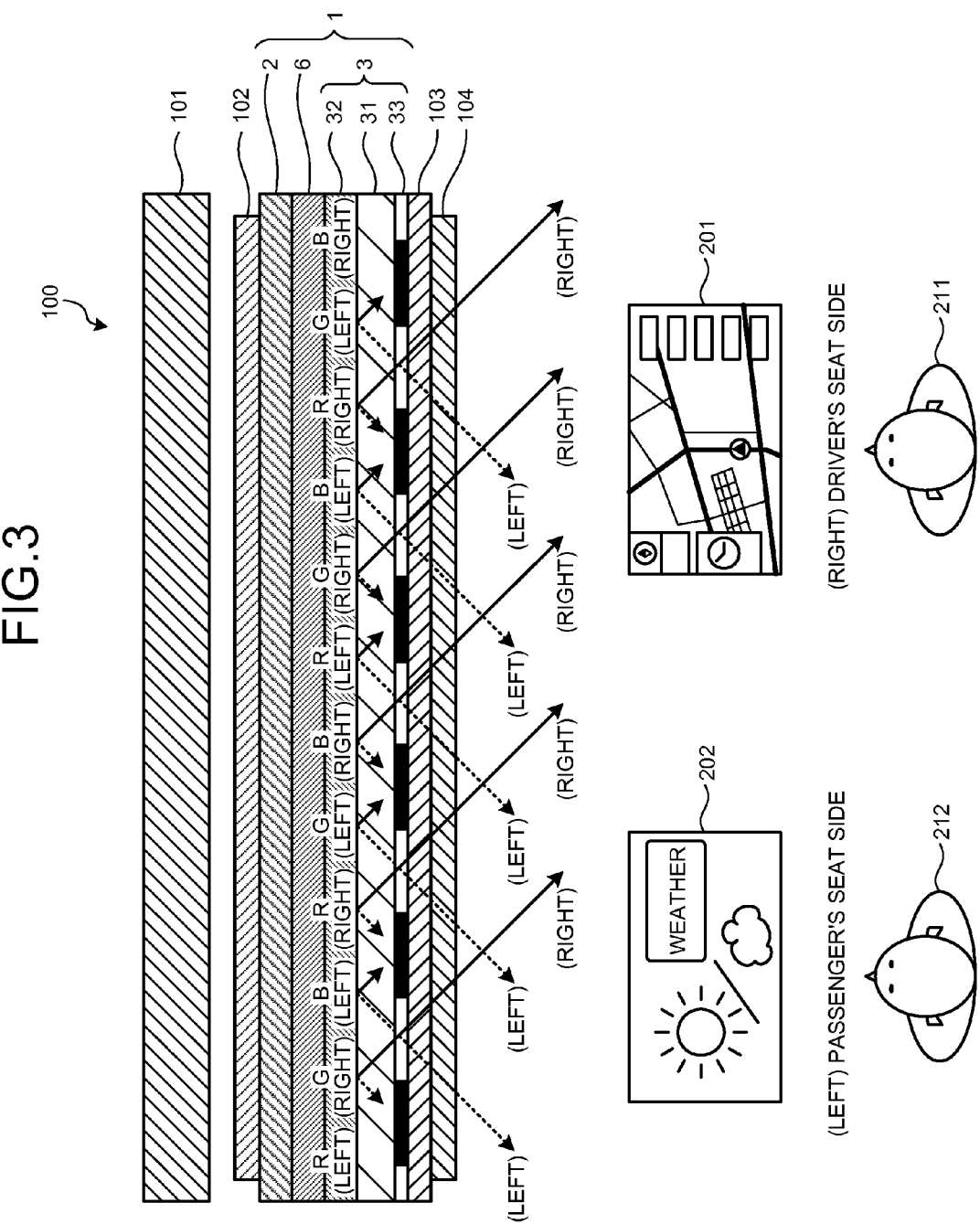
FIG. 3 is a schematic view illustrating a cross sectional structure of the display device.

FIG. 3 is a schematic view illustrating a cross sectional structure of the display device. The display device 100 includes a display panel 1, a backlight 101 which irradiates the display panel 1 with light from a back surface of the display panel 1 (the upper side in FIG. 3), a polarization plate 102 disposed on the back surface of the display panel 1, a glass substrate 103 disposed on a front surface of the display panel 1 (the lower side in FIG. 3), and a polarization plate 104 disposed on a front surface of the glass substrate 103. The display panel 1 includes a TFT (Thin Film Transistor) substrate 2, a counter substrate 3 oppositely disposed to the front face side of the TFT substrate 2, and a liquid crystal 6 interposed between the TFT substrate 2 and the counter substrate 3.

The counter substrate 3 includes a glass substrate 31, a color filter 32 formed on a back surface of the glass substrate 31 (a surface on the side of the TFT substrate 2), and a parallax barrier 33 formed on a front surface of the glass substrate 31 (a surface on the opposite side from the TFT substrate 2). The parallax barrier 33 may be formed on the back surface of the glass substrate 31.

The display panel 1 includes pixels arrayed in a matrix. The color filter 32 periodically arrays color regions of three colors including red (R), green (G), and blue (B) for example, so that each of three color (RGB) regions is regularly associated with each pixel in the display panel 1. So long as the color filter 32 has different colored regions, other color combination may be employed. In general, in the color filter, a luminance of the green (G) color region is higher than a luminance of the red (R) color region, and higher than a luminance of the blue (B) color region.

Pixels of the display panel 1 are controlled in such a manner that each pixel is allocated for either the first direction side display (the driver 211 side display) or the second direction side display (the passenger 212 side display). Pixels for the first direction side display (the driver 211 side display) are configured to be viewed only from the first direction side (the driver 211 side) and not to be viewed from the second direction side (the passenger 212 side) by means of the parallax barrier 33. Pixels for the second direction side display (the passenger 212 side display) are configured to be viewed only from the second direction side (the passenger 212 side) and not to be viewed from the first direction side (the driver 211 side) by means of the parallax barrier 33. Thereby, the display device 100 can provide different images to the driver 211 and the passenger 212, respectively. In other words, the display device 100 shows the navigation map image 201 to the driver 211, and simultaneously shows the TV program image 202 to the passenger 212. Incidentally, it is also possible to show more images in three or more directions by adapting or changing the configuration of the parallax barrier 33 and/or the configuration of pixels of the display panel 1. Furthermore, it is possible to change or vary the viewing angle by using a liquid crystal shutter or the like capable of being electrically driven, as the parallax barrier 33 itself.

Figure 4:
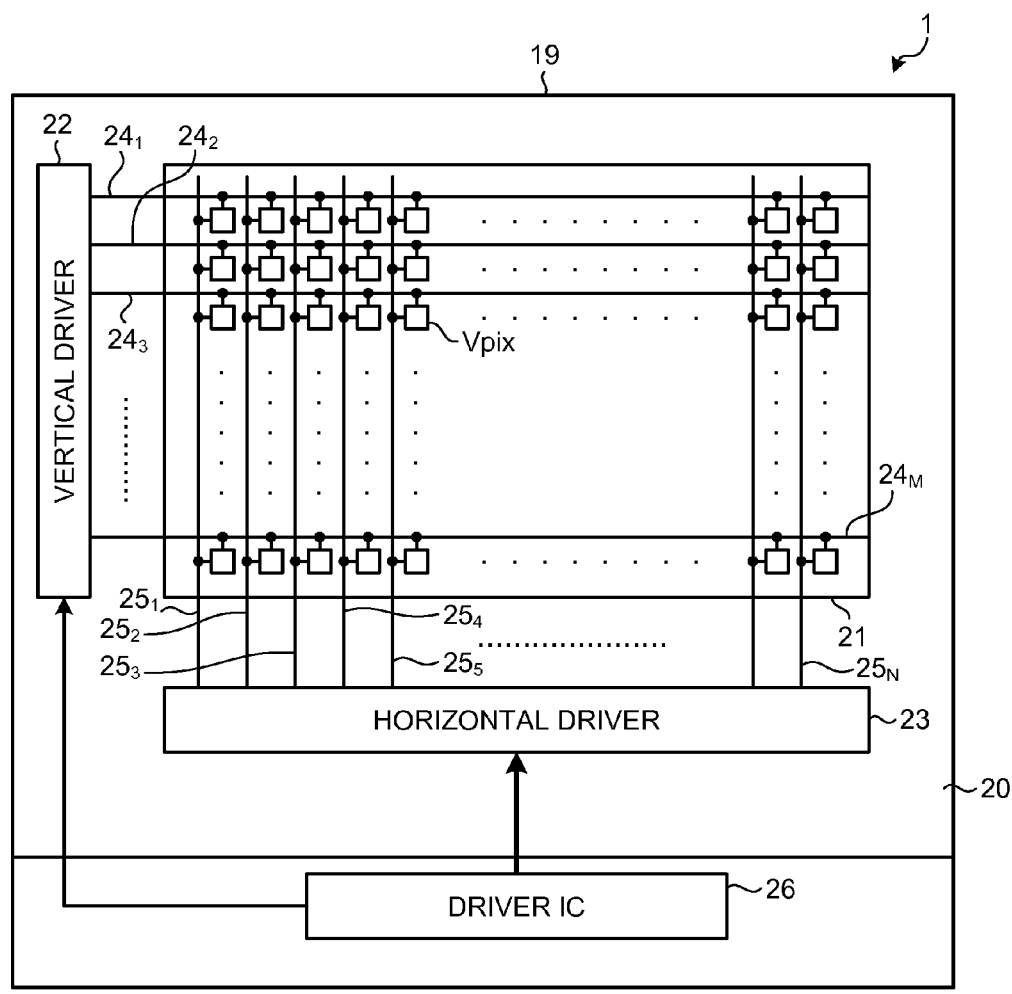
FIG. 4 is a block diagram illustrating a configuration example of a liquid crystal display panel.

FIG. 4 is a block diagram illustrating an exemplary configuration of a liquid crystal display (LCD) panel. The display panel 1, which is a transmissive or transflective liquid crystal display panel, includes a liquid crystal display (LCD) panel 19 and a driver IC 26. An FPC (Flexible Printed Circuits), which is not illustrated, transmits an external signal to the driver IC 26 or transmits drive power for driving the driver IC 26. The liquid crystal display panel 19 includes a translucent insulating substrate such as a glass substrate 20, a display area 21 which is located on the surface of the glass substrate 20 and on which the plurality of pixels each including a liquid crystal cell are arrayed in a matrix, a vertical driver (a vertical drive circuit) 22, and a horizontal driver (a horizontal drive circuit) 23. The glass substrate 20 includes a first substrate (the TFT substrate) 2 (see FIG. 3) on which the plurality of pixel circuits each including an active element (e.g. transistor), are formed and arrayed in a matrix, and includes a second substrate (the counter substrate) 3 (see FIG. 3) oppositely disposed to the TFT substrate 2 with a predetermined gap. The gap between the TFT substrate 2 and the counter substrate 3 is kept at a predetermined gap by photospacers placed at given positions on the TFT substrate 2. Liquid crystal 6 is filled and sealed in a space between the TFT substrate 2 and the counter substrate 3 to form a liquid crystal layer (see FIG. 3).

(Exemplary System Configuration of LCD Panel)

The liquid crystal display panel 19 includes, on the glass substrate 20, the display area 21, the driver IC 26 having a function of an interface (I/F) and a function of a timing generator, the vertical driver 22, and the horizontal driver 23.

The display area 21 has a matrix structure in which the plurality of pixels Vpix each including the liquid crystal cell are arrayed in the matrix of M rows by N columns. In this case, each of pixels Vpix is a unit to be one pixel in displaying an image. Herein, "row" means a pixel row in which N pixels Vpix are aligned in one direction, and "column" means a pixel column in which M pixels Vpix are aligned in another direction orthogonal to the row direction. Values of M and N are determined depending on a display resolution in the vertical direction and a display resolution in the horizontal direction. In the display area region 21, scanning lines $24_1$, $24_2$, $24_3$, ..., $24_M$ are extending line by line in the row direction, and signal lines $25_1$, $25_2$, $25_3$, ..., $25_N$ are extending line by line in the column direction, in the matrix of M rows by N columns for Vpix. Hereinafter, in the present embodiment, the scanning lines $24_1$, $24_2$, $24_3$, ..., $24_M$ may be collectively called scanning lines 24 and the signal lines $25_1$, $25_2$, $25_3$, ..., $25_N$ may be collectively called signal lines 25. In the present embodiment, any three of the scanning lines $24_1$, $24_2$, $24_3$, ..., $24_M$ are referred to as $24_m$, $24_{m+1}$, and $24_{m+2}$ (m is a natural number satisfying a relation of m≤M−2) and any three of the signal lines $25_1$, $25_2$, $25_3$, ..., $25_N$ are referred to as $25_n$, $25_{n+1}$, and $25_{n+2}$ (n is a natural number satisfying a relation of n≤N−2).

External signals including a master clock, a horizontal synchronization signal, and a vertical synchronization signal are input to the display device 1 from outside and are supplied to the driver IC 26. The driver IC 26 converts the master clock, the horizontal synchronization signal, and the vertical synchronization signal with a voltage amplitude of an external power supply into those with a voltage amplitude of an internal power supply required for driving the liquid crystal, so that a master clock, a horizontal synchronization signal, and a vertical synchronization signal with the converted voltage amplitude are generated. The driver IC 26 provides the generated master clock, horizontal synchronization signal, and vertical synchronization signal to the vertical driver 22 and the horizontal driver 23. The driver IC 26 generates a common potential (a counter electrode potential) to be provided commonly to each pixel for a drive electrode of each of the pixels Vpix, and provides the common potential to the display area 21.

The vertical driver 22 sequentially samples and latches display data, output from the driver IC 26 in synchronization with a vertical clock pulse, for one horizontal period. The vertical driver 22 sequentially outputs one line of the latched digital data as a vertical scanning pulse, and provides the vertical scanning pulse to the scanning lines $24_m$, $24_{m+1}$, and $24_{m+2}$ etc. in the display area 21 to sequentially select the pixels Vpix row by row. The vertical driver 22 sequentially outputs digital data to the scanning lines $24_m$, $24_{m+1}$, and $24_{m+2}$ from the upper portion of the display area 21, that is from the top in the vertical scanning direction, to the lower portion of the display area 21, that is to the bottom of the vertical scanning direction, for example. The vertical driver 22 can also sequentially output digital data to the scanning lines $24_m$, $24_{m+1}$, and $24_{m+2}$ from the lower portion of the display area 21, that is from the bottom in the vertical scanning direction, to the upper portion of the display area 21, that is to the top in the vertical scanning direction.

Digital video data such as R (red), G (green), and B (blue) digital video data of 6 bits is provided to the horizontal driver 23. The horizontal driver 23 writes display data through the signal line 25 to each of pixels Vpix in a row selected by vertical scanning by the vertical driver 22, to each plural number of the pixels Vpix, or to all of the pixels Vpix together.

In the display device 10, a specific resistance (a resistance value specific to material) or the like of the liquid crystal may be deteriorated because of a continuous application of DC voltage of the same polarity to liquid crystal. To prevent such deterioration of the specific resistance or the like of the liquid crystal, the display device 10 adopts a driving method of inverting a polarity of a video signal at predetermined intervals on the basis of the common potential of the drive signal.

As the driving method of the display panel, there are known a line inversion, a dot inversion, a frame inversion, and the like. The line inversion is a driving method in which the polarity of video signals is reversed in a time cycle of 1H ("H" refers to a horizontal period) that corresponds to one line (one pixel row). The dot inversion is a driving method in which the polarities of video signals of adjacent upper and lower pixels or adjacent left and right pixels are reversed alternately. The frame inversion is a driving method in which video signals to be written to all pixels in one frame that corresponds to one screen have the same polarity, and the polarity of the video signals is reversed all at once. It is possible for the display device 100 to employ any of the above driving methods.

Figure 5:
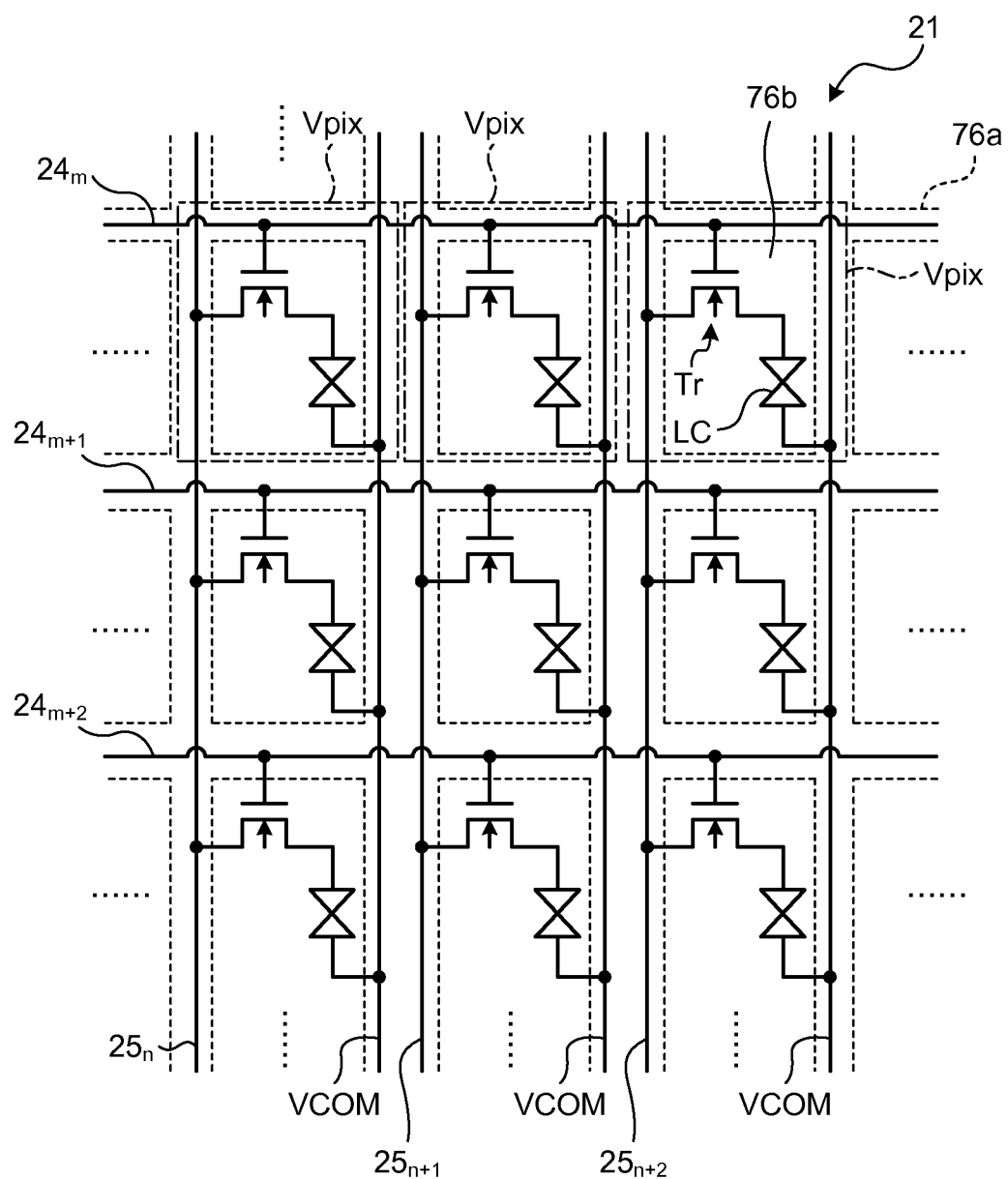
FIG. 5 is a circuit diagram illustrating a drive circuit that drives pixels of a display panel according to the embodiment.

FIG. 5 is a circuit diagram illustrating a drive circuit that drives pixels of the display panel according to the present embodiment. In the display area 21, wiring is disposed such as the signal lines $25_n$, $25_{n+1}$, and $25_{n+2}$, each of which supplies a pixel signal as display data to the TFT element Tr of the pixel Vpix, and the scanning lines $24_m$, $24_{m+1}$, and $24_{m+2}$, each of which drives the TFT element Tr. The signal lines $25_n$, $25_{n+1}$, and $25_{n+2}$ extend on a plane parallel to the surface of the glass substrate 20 described above. The pixel Vpix includes the TFT element Tr and a liquid crystal LC. The TFT element Tr is configured by a thin film transistor (TFT), in this example, an nMOS (negative channel Metal Oxide Semiconductor) type TFT. One of a source and a drain of the TFT element Tr is connected to each of the signal lines $25_n$, $25_{n+1}$, and $25_{n+2}$. A gate of the TFT element Tr is connected to each of the scanning lines $24_m$, $24_{m+1}$, and $24_{m+2}$. The other of the source and the drain of the TFT element Tr is connected to a pixel electrode (not illustrated). The liquid crystal LC is aligned in a direction along an electric field generated by the pixel electrodes and common electrodes VCOM.

The pixel Vpix and another pixel Vpix that belong to the same row of the display area 21 are connected to each other by each of the scanning lines $24_m$, $24_{m+1}$, and $24_{m+2}$. The scanning lines $24_m$, $24_{m+1}$, and $24_{m+2}$ are connected to the vertical driver 22, and are supplied with a vertical scanning pulse of a scanning signal from the vertical driver 22. The pixel Vpix and another pixel Vpix that belong to the same column of the display area 21 are connected to each other by each of the signal lines $25_n$, $25_{n+1}$, and $25_{n+2}$. The signal lines $25_n$, $25_{n+1}$, and $25_{n+2}$ are connected to the horizontal driver 23, and are supplied with a pixel signal from the horizontal driver 23. The common electrode VCOM is connected to the driver IC 26 in FIG. 4, and is supplied with a drive signal from the driver IC 26.

The vertical driver 22 illustrated in FIG. 4 applies a vertical scanning pulse to the gate of the TFT element Tr of the pixel Vpix through each of the scanning lines $24_m$, $24_{m+1}$, and $24_{m+2}$ to sequentially select one row (one horizontal line) of the pixels Vpix formed in a matrix on the display area 21 as a display drive target. The horizontal driver 23 illustrated in FIG. 4 supplies a pixel signal through the signal lines $25_n$, $25_{n+1}$, and $25_{n+2}$ illustrated in FIG. 5 to each of the pixels Vpix included in one horizontal line sequentially selected by the vertical driver 22. The pixels Vpix hold therein the supplied pixel signal for their selection period, and continuously display the pixel signal even for a period after the selection period until the next frame.

As described above, the display panel 1 drives the vertical driver 22 so as to sequentially scan the scanning lines $24_m$, $24_{m+1}$, and $24_{m+2}$, and therefore one horizontal line is sequentially selected. In the display device 100, the horizontal driver 23 supplies a pixel signal to pixels Vpix that belong to one horizontal line, and therefore display of each horizontal line is performed.

The display area 21 includes a color filter. The color filter includes a lattice-shaped black matrix 76a and an opening 76b that corresponds to the pixel Vpix. The opening 76b includes color regions that are colored by three red (R), green (G), and blue (B) colors, for example. The color filter can be colored by another color combination as long as the color filter is colored by colors different from each other. Generally, in the color filter, the luminance of the green (G) color region is higher than the luminance of the red (R) and higher than the luminance of the blue (B) color regions. The display area 21 does not necessarily include the color filter. In this case, the display area 21 is white. For another example, a light-transmissive resin can be used for the color filter to make the color filter white.

As illustrated in FIG. 5, the black matrix 76a is formed so as to cover the outer periphery of the pixel Vpix. That is, the black matrix 76a has a lattice shape because it is arranged at a boundary of the pixels Vpix that are arranged two dimensionally. This prevents light from leaking through a gap between the pixels Vpix, and can suppress contrast reduction. The black matrix 76a is formed from a material with a high light-absorption rate, such as chromium (Cr) metal, chromium oxide ($CrO_2$), and resin. Therefore, the black matrix 76a is a light blocking layer that suppresses light transmission. The opening 76b is formed by the lattice shape of the black matrix 76a, and is arranged corresponding to the pixel Vpix.

The opening 76b includes the color regions that are colored by three red (R), green (G), and blue (B) colors, for example. The color filter periodically arrays each of the color regions that are respectively colored by three colors including red (R), green (G), and blue (B) colors, for example, in the opening 76b, and routinely brings the three R, G, and B color regions into correspondence with the respective pixels Vpix illustrated in FIG. 5.

When the display area 21 is viewed from a direction perpendicular to the front surface, the scanning line 24 and the signal line 25 are arranged in a region overlapped with the black matrix 76a of the color filter. That is, when viewed from a direction perpendicular to the front surface, the scanning line 24 and the signal line 25 are behind the black matrix 76a and cannot be seen. In the display area 21, a region where the black matrix 76a is not arranged is the opening 76b.

Figure 6:
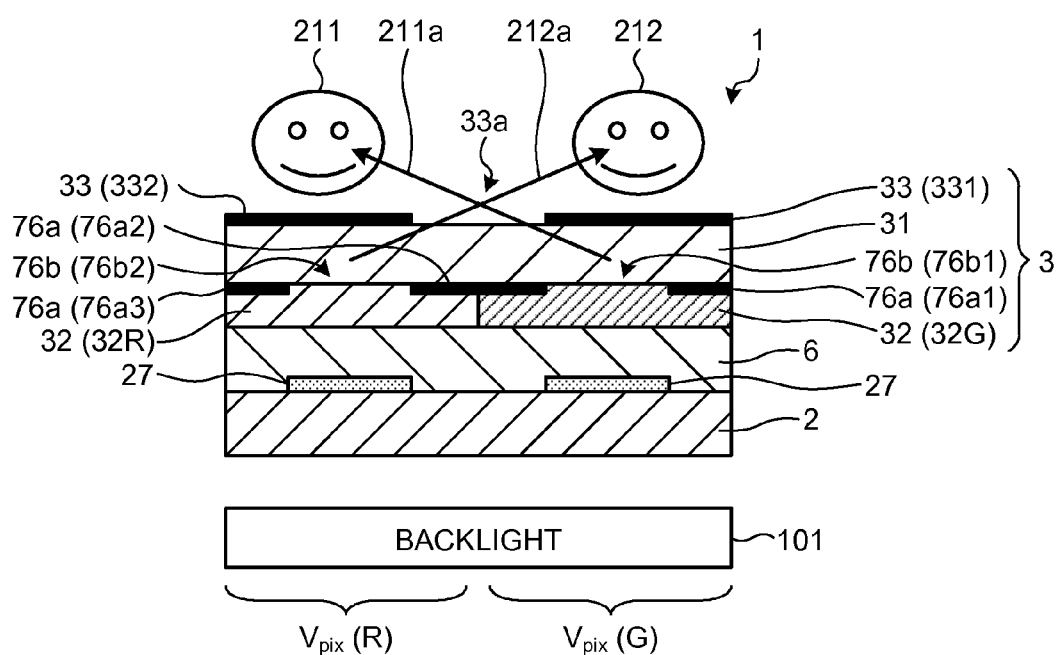
FIG. 6 is a cross-sectional view illustrating a display panel.

FIG. 6 is a cross-sectional view of a display panel. FIG. 6 illustrates two adjacent pixels of the display panel 1. A red (R) pixel Vpix(R) is positioned on the left side of FIG. 6. A green (G) pixel Vpix(G) is positioned on the right side of FIG. 6. The pixel Vpix(R) and the pixel Vpix(G) are adjacent to each other. Each of the pixel Vpix(R) and the pixel Vpix(G) includes a pixel electrode 27 on the front surface of the TFT substrate 2 (on the surface on the side of the counter substrate 3).

The liquid crystal 6 modulates the light passing therethrough depending on a state of an electric field between the pixel electrode 27 and the common electrode VCOM (see FIG. 5), and uses various liquid-crystal modes such as TN (Twisted Nematic), VA (Vertical Alignment), ECB (Electrically Controlled Birefringence), FFS (Fringe Field Switching), and IPS (In Plane Switching).

Respective alignment films are provided between the liquid crystal 6 and the TFT substrate 2 and between the liquid crystal 6 and the counter substrate 3. An incident-side polarization plate can also be arranged on the back-surface side of the TFT substrate 2.

The pixel Vpix(R) includes a red (R) color filter 32R on the back surface of the glass substrate 31 (on the surface on the side of the TFT substrate 2). The pixel Vpix(G) includes a green (G) color filter 32G on the back surface of the glass substrate 31. On the back surface of the glass substrate 31 and at the right end portion of the pixel Vpix(G), a black matrix 76a1 is formed as a light blocking layer. On the back surface of the glass substrate 31 and at a portion bridging over the pixels Vpix(R) and Vpix(G), a black matrix 76a2 is formed as a light blocking layer. On the back surface of the glass substrate 31 and at the left end portion of the pixel Vpix(R), a black matrix 76a3 is formed as a light blocking layer. An opening 76b1, in which a light blocking layer is not formed, is defined between the black matrix 76a1 and the black matrix 76a2. An opening 76b2, in which a light blocking layer is not formed, is defined between the black matrix 76a2 and the black matrix 76a3. Light having entered from the backlight 101 into the display panel 1 can pass through the opening 76b1 and the opening 76b2.

On the front surface of the glass substrate 31 (the surface on the opposite side to the TFT substrate 2), and from the center to the right end of the pixel Vpix(G), a parallax barrier 331 is formed as a light blocking layer. On the front surface of the glass substrate 31, and from the center to the left end of the pixel Vpix(R), a parallax barrier 332 is formed as a light blocking layer. The parallax barriers 331 and 332 are formed from a material with a high light-absorption rate, such as chromium (Cr) metal, chromium oxide ($CrO_2$), and resin. The parallax barriers 331 and 332 can be formed from a material that is the same as or different from the material of the black matrixes 76a1, 76a2, and 76a3. On the front surface of the glass substrate 31, a portion bridging over the pixels Vpix(R) and Vpix(G) is an opening 33a in which a light blocking layer is not formed.

Light having passed through the opening 76b1 of the pixel Vpix(G) passes through the opening 33a along the direction of an arrow 211a, and reaches the viewer 211. The light having passed through the opening 76b1 of the pixel Vpix(G) is blocked by the parallax barrier 331, and therefore does not reach the viewer 212 except diffracted light described later. Light having passed through the opening 76b2 of the pixel Vpix(R) passes through the opening 33a along the direction of an arrow 212a, and reaches the viewer 212. The light having passed through the opening 76b2 of the pixel Vpix(R) is blocked by the parallax barrier 332, and therefore does not reach the viewer 211 except diffracted light described later. Therefore, the display panel 1 can show separate images to the viewers 211 and 212.

Figure 7:
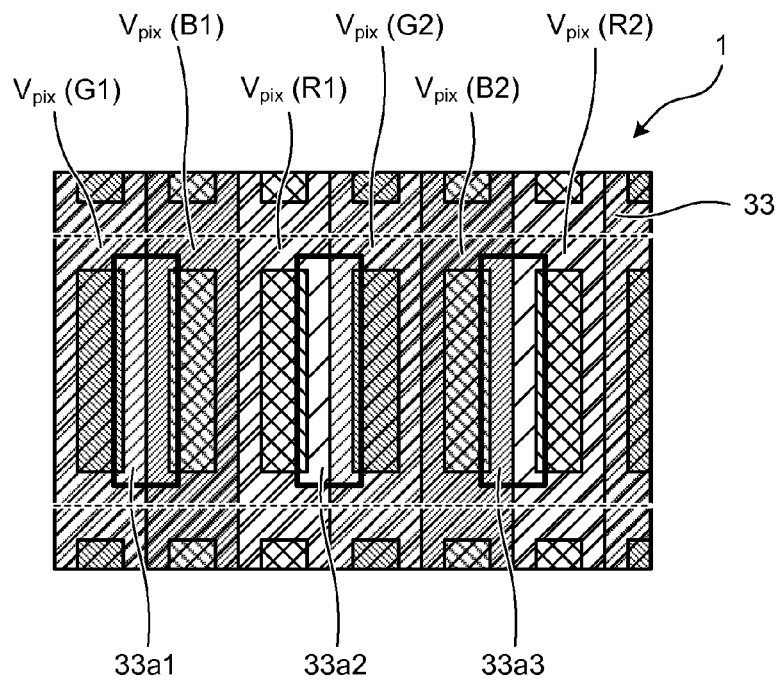
FIG. 7 is a plan view illustrating a display panel.

FIG. 7 is a plan view of a display panel. The display panel 1 includes pixels Vpix(G1), Vpix(B1), Vpix(R1), Vpix(G2), Vpix(B2), and Vpix(R2) that extend longitudinally in the vertical direction in FIG. 7, and that are adjacent to each other in the left-right direction in FIG. 7. The parallax barrier 33 is formed on the top layer of the display panel 1 (in front of the plane of the drawing sheet). At a portion bridging over the pixels Vpix(G1) and Vpix(B1), an opening 33a1 is provided in which a light blocking layer is not formed. At a portion bridging over the pixels Vpix(R1) and Vpix(G2), an opening 33a2 is provided in which a light blocking layer is not formed. At a portion bridging over the pixels Vpix(B2) and Vpix(R2), an opening 33a3 is provided in which a light blocking layer is not formed.

Figure 8:
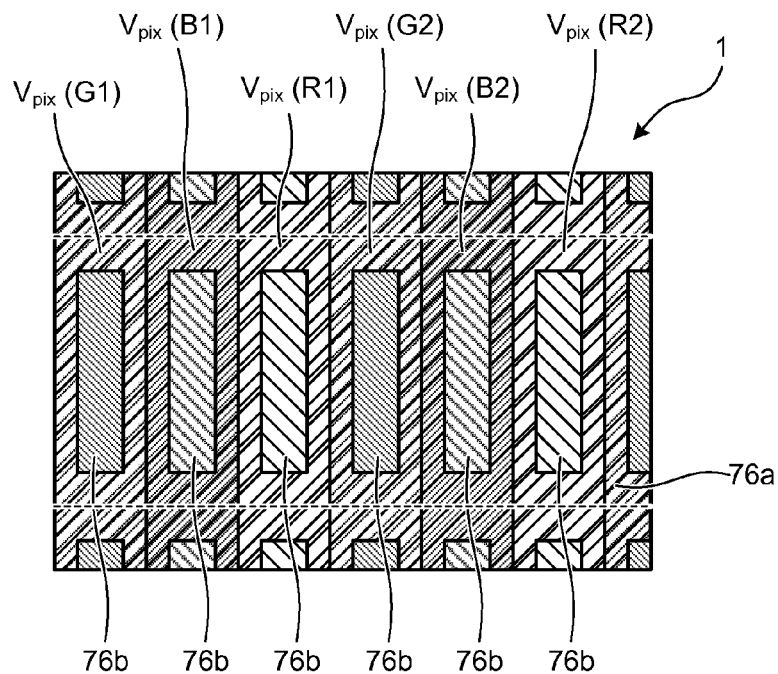
FIG. 8 is a plan in which a parallax barrier of the display panel in FIG. 7 is omitted.

FIG. 8 is a plan view in which a parallax barrier of the display panel in FIG. 7 is not illustrated. The display panel 1 includes the pixels Vpix(G1), Vpix(B1), Vpix(R1), Vpix(G2), Vpix(B2), and Vpix(R2) that extend longitudinally in the vertical direction in FIG. 8, and that are adjacent to each other in the left-right direction in FIG. 8. As illustrated in FIG. 8, the black matrix 76a is formed so as to cover the outer periphery of each of the pixels Vpix(G1), Vpix(B1), Vpix(R1), Vpix(G2), Vpix(B2), and Vpix(R2). That is, the black matrix 76a has a lattice shape because it is arranged at a boundary of the pixels Vpix that are arranged two dimensionally.

(Crosstalk Between Two Images)

Figure 9:
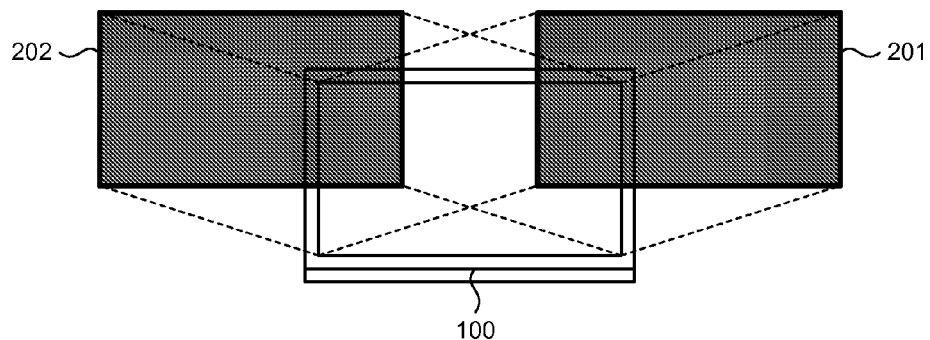
FIG. 9 is an explanatory diagram for illustrating measurement of crosstalk between two images.
Figure 10:
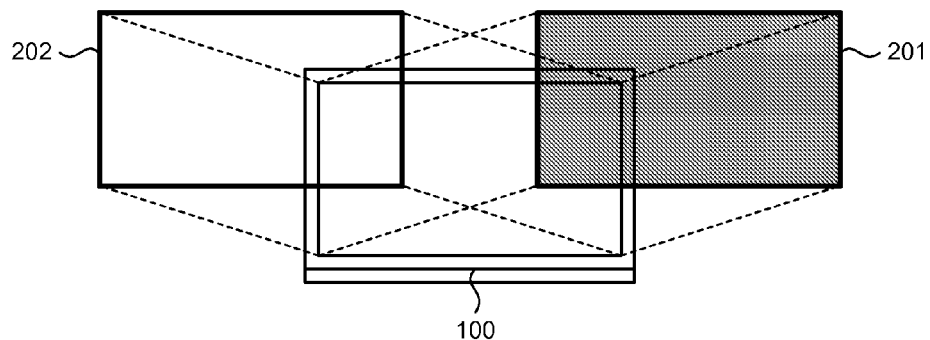
FIG. 10 is another explanatory diagram for illustrating measurement of crosstalk between two images.

It is ideal that the first image 201 and the second image 202 do not interfere with each other. However, interference occurs between them in practice. FIGS. 9 and 10 are explanatory diagrams for illustrating measurement of crosstalk between two images. First, as illustrated in FIG. 9, entirely-black-colored images are displayed as the first image 201 and the second image 202. At this time, the luminance of the first image 201 (hereinafter, sometimes "black luminance") is measured, and the measured black luminance is designated as A.

Next, as illustrated in FIG. 10, an entirely-white-colored image is displayed as the second image 202. The first image 201 then has higher luminance (turns lighter black) due to crosstalk of the second image 202. At this time, the luminance of the first image 201 is measured, and the measured luminance is designated as B.

At this time, crosstalk X between the first image 201 and the second image 202 is expressed by the following equation (1).

$$X = (B-A)/A \tag{1}$$

The equation (1) means a ratio of the luminance increment (B−A) to the original black luminance A. Here, the luminance increment (B−A) is due to the light leakage from the second image 202 to the first image 201.

In order to display the first image 201 and the second image 202 separately from each other, it is preferable that the crosstalk X in the equation (1) is equal to or smaller than 1.

The light leakage from one image to the other image, which causes a crosstalk, is considered to be caused by diffracted light.

Figure 11:
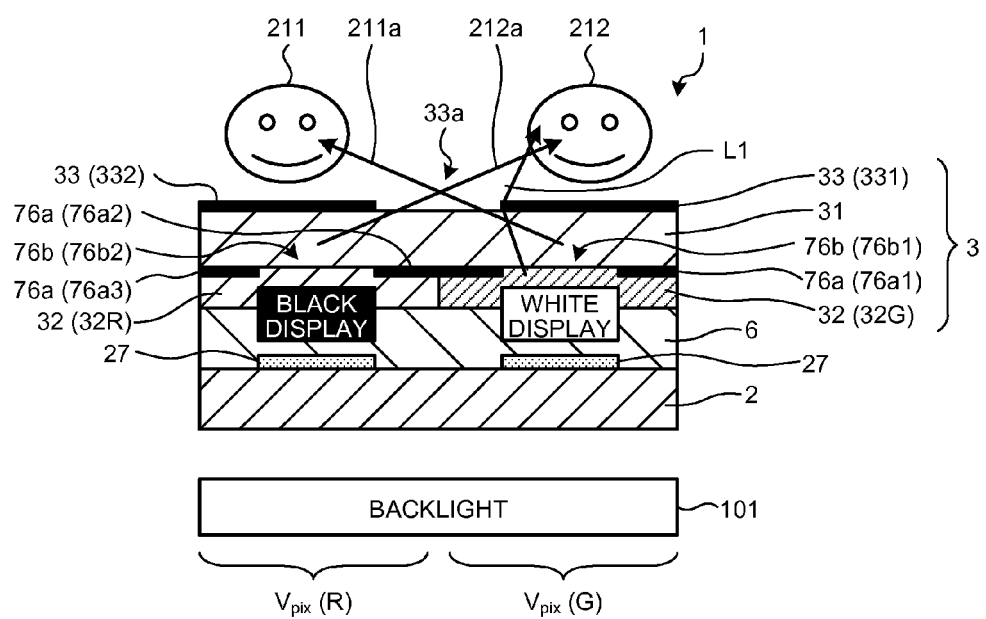
FIG. 11 is a schematic view illustrating a path of diffracted light of a display panel.

FIG. 11 is a schematic view illustrating a path of diffracted light of a display panel. When the pixel Vpix(R) displays black (low-luminance display) and the pixel Vpix(G) displays white (high-luminance display), the major portion of light having passed through the opening 76b1 of the pixel Vpix(G) passes through the opening 33a along the direction of the arrow 211a, and reaches the viewer 211. However, it is considered that a part of the light having passed through the opening 76b1 of the pixel Vpix(G) is diffracted at a boundary of the opening 33a and reaches the viewer 212 along the direction of an arrow L1.

Figure 12:
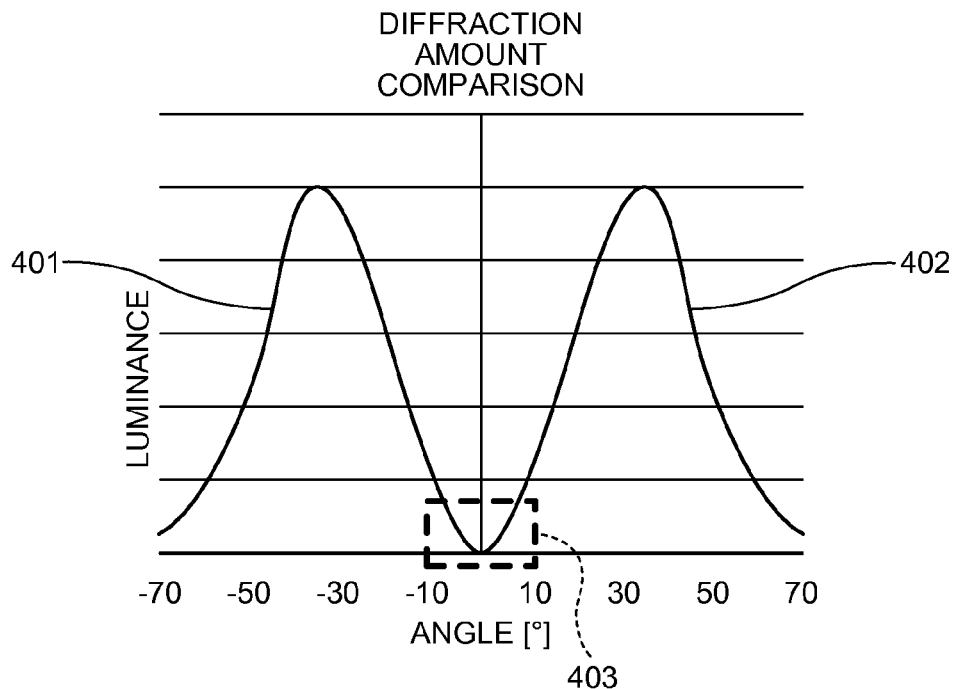
FIG. 12 is a graph illustrating a simulation result of diffracted light.

FIG. 12 is a graph illustrating a simulation result of diffracted light. In FIG. 12, the horizontal axis represents the angle from the display panel 1 when the angle in the normal direction of the display panel 1 is defined as 0°. The angle from the display panel 1 in the counterclockwise direction (on the side of the viewer 211) is represented as a minus angle. The angle from the display panel 1 in the clockwise direction (on the side of the viewer 212) is represented as a plus angle. The vertical axis represents the luminance. A line 401 shows the luminance at respective angles when a white-colored image is displayed as the first image 201, and a black-colored image is displayed as the second image 202. A line 402 shows the luminance at respective angles when a black-colored image is displayed as the first image 201, and a white-colored image is displayed as the second image 202.

Figure 13:
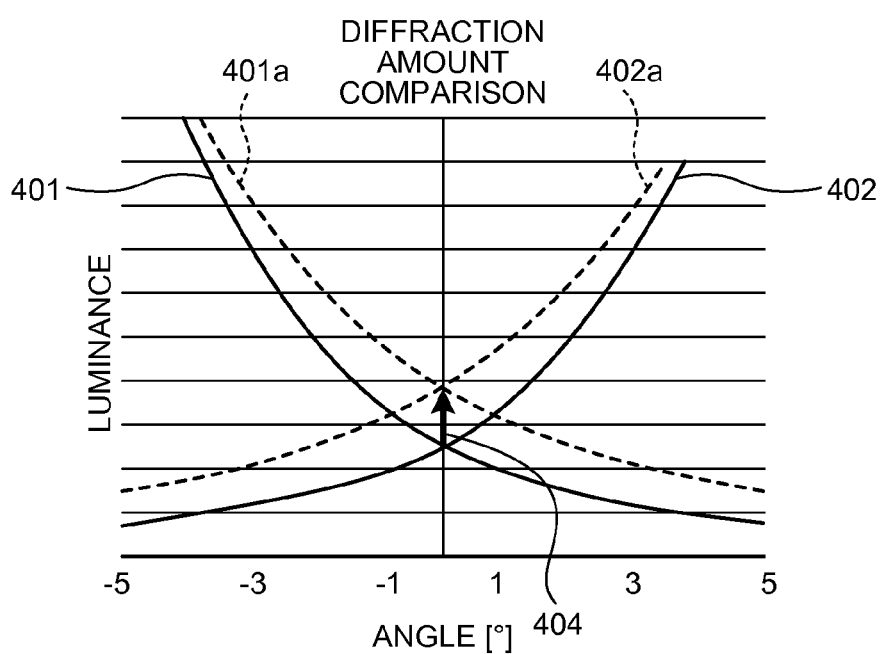
FIG. 13 is an enlarged view illustrating a region near an origin point of FIG. 12.

FIG. 13 is an enlarged view of a region 403 near an origin point of FIG. 12. The line 401 represents the luminance at respective angles when a white-colored image is displayed as the first image 201, a black-colored image is displayed as the second image 202, and there is no diffracted light. A line 401a represents the luminance at respective angles when a white-colored image is displayed as the first image 201, a black-colored image is displayed as the second image 202, and there is diffracted light. The line 402 represents the luminance at respective angles when a black-colored image is displayed as the first image 201, a white-colored image is displayed as the second image 202, and there is no diffracted light. A line 402a represents the luminance at respective angles when a black-colored image is displayed as the first image 201, a white-colored image is displayed as the second image 202, and there is diffracted light.

As illustrated in FIG. 13, in a case where there is diffracted light (the lines 401a and 402a), the luminance is increased by an amount of an arrow 404 in the normal direction of the display panel 1 (the 0° angle) as compared to the case where there is no diffracted light (the lines 401 and 402).

The luminance B described above can be regarded as the sum of the black luminance A described above and diffracted light C.

$$B = A + C \quad (2)$$

Based on the equations (1) and (2), the following equation (3) holds.

$$X = \frac{(B - A)}{A}$$
$$= \frac{((A + C) - A)}{A} \quad (3)$$
$$= C/A$$

It is desirable that the crosstalk X is equal to or smaller than 1.

$$X = C/A \le 1 \quad (4)$$

That is, when the black luminance A is increased to the luminance of the diffracted light C or higher, desirable crosstalk X can be obtained and crosstalk on the wide-angle side is improved. When the black luminance A is increased excessively, the contrast at the eye-points (the eye positions of the viewers 211 and 212) is reduced. Therefore, it is preferable that the black luminance A is increased to the same level as the diffracted light C. That is, it is preferable that the crosstalk X becomes approximately 1.

Comparative Embodiments

Figure 14:
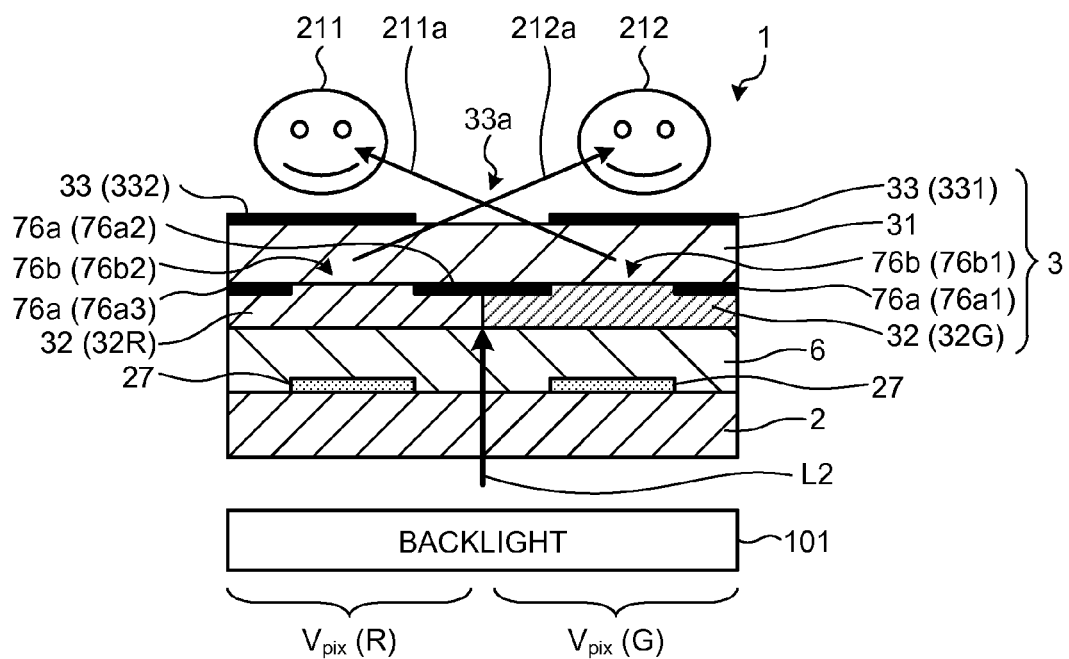
FIG. 14 is a cross-sectional view illustrating a display panel in a comparative embodiment.

FIG. 14 is a cross-sectional view illustrating a display panel according to a comparative embodiment. FIG. 14 illustrates two adjacent pixels of the display panel 1 according to the comparative embodiment. The red (R) pixel Vpix(R) is positioned on the left side of FIG. 14. The green (G) pixel Vpix(G) is positioned on the right side of FIG. 14. The pixel Vpix(R) and the pixel Vpix(G) are adjacent to each other.

The pixel Vpix(R) includes the red (R) color filter 32R on the back surface of the glass substrate 31 (on the surface on the side of the TFT substrate 2). The pixel Vpix(G) includes the green (G) color filter 32G on the back surface of the glass substrate 31. On the back surface of the glass substrate 31 and at the right end portion of the pixel Vpix(G), the black matrix 76a1 is formed as a light blocking layer. On the back surface of the glass substrate 31 and at a portion bridging over the pixels Vpix(R) and Vpix(G), the black matrix 76a2 is formed as a light blocking layer. On the back surface of the glass substrate 31 and at the left end portion of the pixel Vpix(R), the black matrix 76a3 is formed as a light blocking layer. The opening 76b1, in which a light blocking layer is not formed, is defined between the black matrix 76a1 and the black matrix 76a2. The opening 76b2, in which a light blocking layer is not formed, is defined between the black matrix 76a2 and the black matrix 76a3. Light having entered from the backlight 101 into the display panel 1 can pass through the opening 76b1 and the opening 76b2.

On the front surface of the glass substrate 31 (the surface on the opposite side from the TFT substrate 2), and from the center to the right end of the pixel Vpix(G), the parallax barrier 331 is formed as a light blocking layer. On the front surface of the glass substrate 31, and from the center to the left end of the pixel Vpix(R), the parallax barrier 332 is formed as a light blocking layer. On the front surface of the glass substrate 31, a portion bridging over the pixels Vpix(R) and Vpix(G) is the opening 33a in which a light blocking layer is not formed.

Light having passed through the opening 76b1 of the pixel Vpix(G) passes through the opening 33a along the direction of the arrow 211a, and reaches the viewer 211. The light having passed through the opening 76b1 of the pixel Vpix(G) is blocked by the parallax barrier 331, and therefore does not reach the viewer 212 except the diffracted light described above. Light having passed through the opening 76b2 of the pixel Vpix(R) passes through the opening 33a along the direction of the arrow 212a, and reaches the viewer 212. The light having passed through the opening 76b2 of the pixel Vpix(R) is blocked by the parallax barrier 332, and therefore does not reach the viewer 211 except the diffracted light described above. Therefore, the display panel 1 can show separate images to the viewers 211 and 212.

Light L2, having been emitted from the backlight 101 and entered a boundary portion of the pixels Vpix(R) and Vpix (G), is blocked by the black matrix 76a2 that serves as a light blocking layer, and is not emitted to the front surface of the display panel 1. Therefore, on the display panel 1, the black luminance in its normal direction is low, and the crosstalk X expressed by the formula (4) explained above is larger than 1.

(Principle of Present Disclosure)

Figure 15:
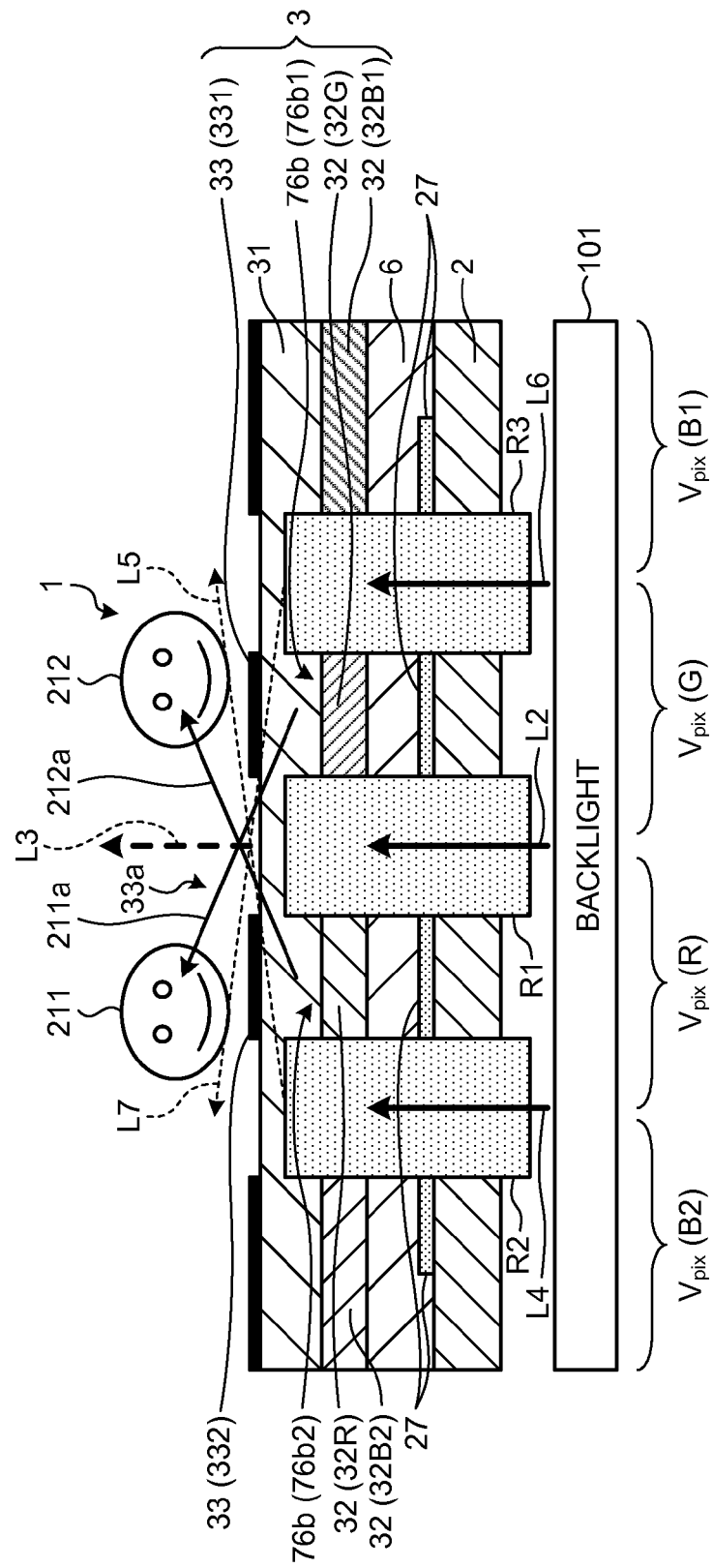
FIG. 15 is a cross-sectional view illustrating a display panel of the present embodiment.

FIG. 15 is a cross-sectional view illustrating a display panel according to the present embodiment. FIG. 15 illustrates four adjacent pixels of the display panel 1 according to the present embodiment. From the right side to the left side in FIG. 15, a blue (B) pixel Vpix(B1), a green (G) pixel Vpix(G), a red (R) pixel Vpix(R), and a blue (B) pixel Vpix(B2) are positioned. The pixel Vpix(B1) and the pixel Vpix(G) are adjacent to each other. The pixel Vpix(G) and the pixel Vpix (R) are adjacent to each other. The pixel Vpix(R) and the pixel Vpix(B2) are adjacent to each other.

The pixel Vpix(R) includes the red (R) color filter 32R on the back surface of the glass substrate 31 (on the surface on the side of the TFT substrate 2). The pixel Vpix(G) includes the green (G) color filter 32G on the back surface of the glass substrate 31. The pixel Vpix(B1) includes a blue (B) color filter 32B1 on the back surface of the glass substrate 31. The pixel Vpix(B2) includes a blue (B) color filter 32B2 on the back surface of the glass substrate 31. The opening 76b2, where a light blocking layer is not formed, is defined between a boundary region R1 between the pixels Vpix(R) and Vpix (G) and a boundary region R2 between the pixels Vpix(R) and Vpix(B2). The opening 76b1, where a light blocking layer is not formed, is defined between the boundary region R1 and a boundary region R3 between the pixels Vpix(G) and Vpix (B1). Light having entered the display panel 1 from the backlight 101 can pass through the opening 76b1 and the opening 76b2.

On the front surface of the glass substrate 31 (the surface on the opposite side from the TFT substrate 2) and at the center portion of the pixel Vpix(G), the parallax barrier 331 is formed as a light blocking layer. On the front surface of the glass substrate 31 and at the center portion of the pixel Vpix (R), the parallax barrier 332 is formed as a light blocking layer. On the front surface of the glass substrate 31, a portion bridging over the pixels Vpix(R) and Vpix(G) is the opening 33a where a light blocking layer is not formed.

Light having passed through the opening 76b1 of the pixel Vpix(G) passes through the opening 33a along the direction of the arrow 211a, and reaches the viewer 211. The light having passed through the opening 76b1 of the pixel Vpix(G) is blocked by the parallax barrier 331, and therefore does not reach the viewer 212 except the diffracted light described above. Light having passed through the opening 76b2 of the pixel Vpix(R) passes through the opening 33a along the direction of the arrow 212a, and reaches the viewer 212. The light having passed through the opening 76b2 of the pixel Vpix(R) is blocked by the parallax barrier 332, and therefore does not reach the viewer 211 except the diffracted light described above. Therefore, the display panel 1 can show separate images to the viewers 211 and 212.

The display panel 1 according to the present embodiment passes at least a part of the light L2, having been emitted from the backlight 101 and entered the boundary region R1 between the pixels Vpix(R) and Vpix(G), and emits this part of the light L2 from the front surface of the display panel 1 as light L3. Therefore, the display panel 1 increases the black luminance in its normal direction (the 0° angle direction), and accordingly the crosstalk X expressed by the formula (4) explained above can become equal to or smaller than 1.

The display panel 1 according to the present embodiment passes at least a part of light L4, having been emitted from the backlight 101 and entered the boundary region R2 between the pixels Vpix(R) and Vpix(B2), and passes this part of the light L4 through the opening 33a to be emitted as light L5. Therefore, the display panel 1 increases the black luminance in the 90° angle direction, and accordingly the crosstalk X expressed by the formula (4) explained above can become equal to or smaller than 1.

The display panel 1 according to the present embodiment passes at least a part of light L6, having been emitted from the backlight 101 and entered the boundary region R3 between the pixels Vpix(G) and Vpix(B1), and passes this part of the light L6 through the opening 33a to be emitted as light L7. Therefore, the display panel 1 increases the black luminance in the −90° angle (minus 90° angle) direction, and accordingly the crosstalk X expressed by the formula (4) explained above can become equal to or smaller than 1.

The crosstalk X is expressed by the formula (4) explained above. That is, when the black luminance A is increased to the luminance of the diffracted light C or higher, desirable crosstalk X can be obtained and crosstalk on the wide-angle side is improved. When the black luminance A is increased excessively, the contrast at the eye-points (the eye positions of the viewers 211 and 212) is reduced. Therefore, it is preferable that the black luminance A is increased to the same level as the diffracted light C, that is, the crosstalk X becomes approximately 1.

Figure 16:
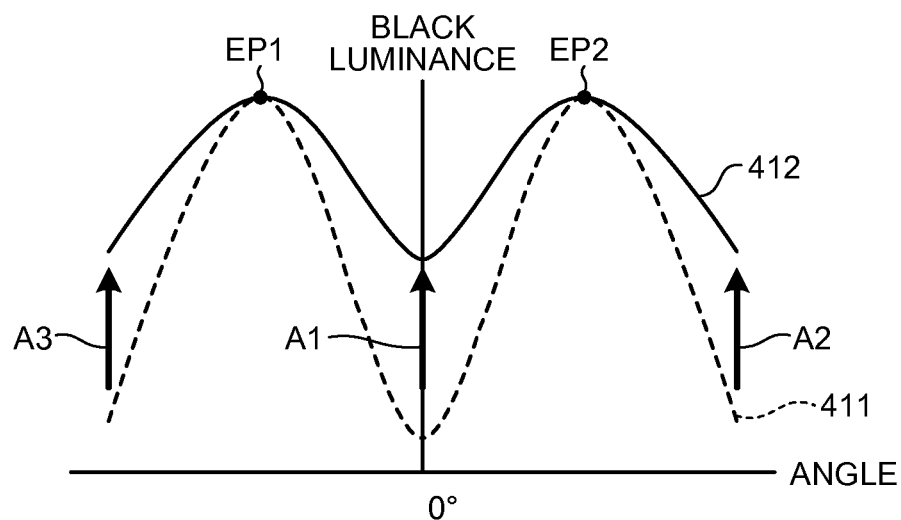
FIG. 16 is a graph illustrating black luminance in the comparative embodiment and black luminance in the present embodiment.

FIG. 16 is a graph illustrating the black luminance in the comparative embodiment and the black luminance in the present embodiment. In FIG. 16, the horizontal axis represents the angle from the display panel 1 when the angle in the normal direction of the display panel 1 is defined as 0°. The angle from the display panel 1 in the counterclockwise direction (on the side of the viewer 211) is represented as a minus angle. The angle from the display panel 1 in the clockwise direction (on the side of the viewer 212) is represented as a plus angle. The vertical axis represents the black luminance. A line 411 represents the black luminance in the comparative embodiment. A line 412 represents the black luminance in the present embodiment. In the present embodiment, the black luminance in the normal direction (the 0° angle), in the 90° angle direction, and in the −90° angle direction is increased, and therefore without increasing the black luminance at an eye-point EP1 of the viewer 211 and at an eye-point EP2 of the viewer 212, that is, while reduction in the contrast at the eye-points EP1 and EP2 is suppressed, the black luminance at other angles (on the wide-angle side) is increased. An arrow A1 in FIG. 16 indicates the black luminance increased by the light L3 in FIG. 15. An arrow A2 in FIG. 16 indicates the black luminance increased by the light L5 in FIG. 15. An arrow A3 in FIG. 16 indicates the black luminance increased by the light L7 in FIG. 15.

Figure 17:
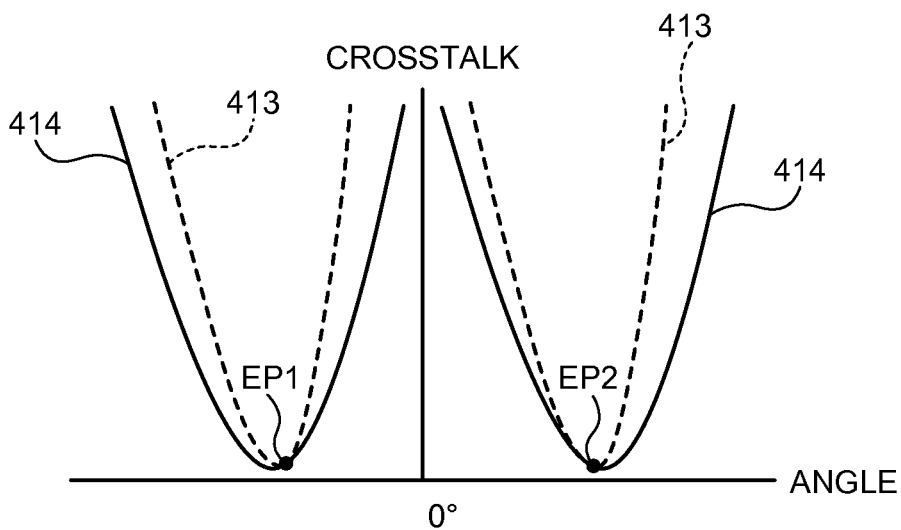
FIG. 17 is a graph illustrating crosstalk in the comparative embodiment and crosstalk in the present embodiment.

FIG. 17 is a graph illustrating a crosstalk in the comparative embodiment and a crosstalk in the present embodiment. In FIG. 17, the horizontal axis represents the angle from the display panel 1 when the angle in the normal direction of the display panel 1 is defined as 0°. The angle from the display panel 1 in the counterclockwise direction (on the side of the viewer 211) is represented as a minus angle. The angle from the display panel 1 in the clockwise direction (on the side of the viewer 212) is represented as a plus angle. The vertical axis represents the crosstalk. A line 413 indicates the crosstalk in the comparative embodiment. A line 414 indicates the crosstalk in the present embodiment. In the present embodiment, the black luminance in the normal direction (the 0° angle), in the 90° angle direction, and in the −90° angle direction is increased, and therefore while a change in the crosstalk at the eye-point EP1 of the viewer 211 and at the eye-point EP2 of the viewer 212 is suppressed, the crosstalk at other angles (on the wide-angle side) can be reduced.

2. First Embodiment

First Embodiment

Figure 18:
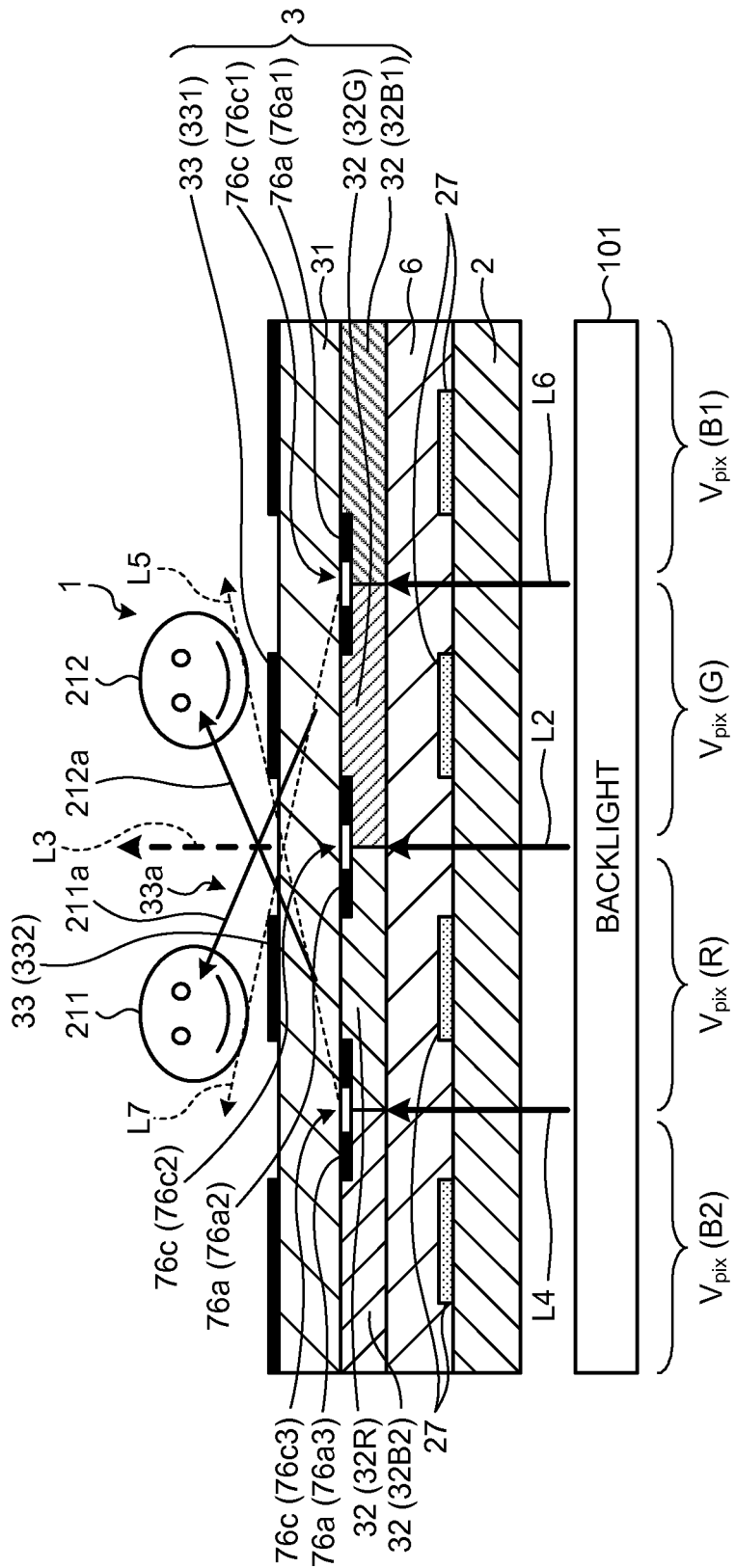
FIG. 18 is a cross-sectional view illustrating a display panel according to a first embodiment.

FIG. 18 is a cross-sectional view illustrating a display panel according to a first embodiment. FIG. 18 illustrates four adjacent pixels of the display panel 1 according to the first embodiment. From the right side to the left side in FIG. 18, the blue (B) pixel Vpix(B1), the green (G) pixel Vpix(G), the red (R) pixel Vpix(R), and the blue (B) pixel Vpix(B2) are positioned. The pixel Vpix(B1) and the pixel Vpix(G) are adjacent to each other. The pixel Vpix(G) and the pixel Vpix(R) are adjacent to each other. The pixel Vpix(R) and the pixel Vpix (B2) are adjacent to each other. Each of the pixels Vpix(B1), Vpix(G), Vpix(R), and Vpix(B2) includes the pixel electrode 27 on the front surface of the TFT substrate 2 (on the surface on the side of the counter substrate 3).

The liquid crystal 6 modulates light passing therethrough, depending on a state of an electric field between the pixel electrode 27 and the common electrode VCOM (see FIG. 5). Various modes of liquid crystal such as TN, VA, ECB, FFS, and IPS may be used.

Respective alignment films are provided between the liquid crystal 6 and the TFT substrate 2 and between the liquid crystal 6 and the counter substrate 3. An incident-side polarization plate may also be arranged on the back-surface side of the TFT substrate 2.

The pixel Vpix(R) includes the red (R) color filter 32R on the back surface of the glass substrate 31 (on the surface on the side of the TFT substrate 2). The pixel Vpix(G) includes the green (G) color filter 32G on the back surface of the glass substrate 31. The pixel Vpix(B1) includes the blue (B) color filter 32B1 on the back surface of the glass substrate 31. The pixel Vpix(B2) includes the blue (B) color filter 32B2 on the back surface of the glass substrate 31. On the back surface of the glass substrate 31 and at a portion bridging over the pixels Vpix(G) and Vpix(B1), the black matrix 76a1 is formed as a light blocking layer. On the back surface of the glass substrate 31 and at a portion bridging over the pixels Vpix(R) and Vpix(G), the black matrix 76a2 is formed as a light blocking layer. On the back surface of the glass substrate 31 and at a portion bridging over the pixels Vpix(R) and Vpix(B2), the black matrix 76a3 is formed as a light blocking layer. The black matrixes 76a1, 76a2, and 76a3 are formed from a material with a high light-absorption rate, such as chromium (Cr) metal, chromium oxide ($CrO_2$), and resin. The opening 76b1, where a light blocking layer is not formed, is defined between the black matrix 76a1 and the black matrix 76a2. The opening 76b2, where a light blocking layer is not formed, is defined between the black matrix 76a2 and the black matrix 76a3. Light having entered the display panel 1 from the backlight 101 can pass through the opening 76b1 and the opening 76b2.

On the front surface of the glass substrate 31 (the surface on the opposite side to the TFT substrate 2) and at the center portion of the pixel Vpix(G), the parallax barrier 331 is formed as a light blocking layer. On the front surface of the glass substrate 31 and at the center portion of the pixel Vpix (R), the parallax barrier 332 is formed as a light blocking layer. The parallax barriers 331 and 332 are formed from a material with a high light-absorption rate, such as chromium (Cr) metal, chromium oxide ($CrO_2$), and resin. The parallax barriers 331 and 332 can be formed from a material that is the same as or different from the material of the black matrixes 76a1, 76a2, and 76a3. On the front surface of the glass substrate 31, a portion bridging over the pixels Vpix(R) and Vpix(G) is the opening 33a where a light blocking layer is not formed.

Light having passed through the opening 76b1 of the pixel Vpix(G) passes through the opening 33a along the direction of the arrow 211a, and reaches the viewer 211. The light having passed through the opening 76b1 of the pixel Vpix(G) is blocked by the parallax barrier 331, and therefore does not reach the viewer 212 except the diffracted light described above. Light having passed through the opening 76b2 of the pixel Vpix(R) passes through the opening 33a along the direction of the arrow 212a, and reaches the viewer 212. The light having passed through the opening 76b2 of the pixel Vpix(R) is blocked by the parallax barrier 332, and therefore does not reach the viewer 211 except the diffracted light described above. Therefore, the display panel 1 can show separate images to the viewers 211 and 212.

In a portion of the black matrix 76a2, which extends across the pixels Vpix(R) and Vpix(G), the opening 76c2 is provided where a light blocking layer is not formed. The light L2, having entered a boundary portion between the pixels Vpix (R) and Vpix(G) from the backlight 101, passes through the opening 76c2 and the opening 33a, and is emitted as the light L3 in the normal direction (the 0° angle direction) of the display panel 1.

The display panel 1 increases the black luminance in the normal direction (the 0° angle direction) due to the light L3, and therefore can reduce crosstalk between two images. The amount of the light L3 can be adjusted by changing the size of the opening 76c2. In the present embodiment, the opening 76c2 is provided so as to bridge over the pixels Vpix(R) and Vpix(G). However, the opening 76c2 may be provided on the top layer of the pixel Vpix(R) or the top layer of the pixel Vpix(G).

In a portion of the black matrix 76a3, which extends across the pixels Vpix(R) and Vpix(B2), the opening 76c3 is provided where a light blocking layer is not formed. The light L4, having entered a boundary portion between the pixels Vpix (R) and Vpix(B2) from the backlight 101, passes through the opening 76c3 and the opening 33a, and is emitted as the light L5 in the 90° angle direction.

The display panel 1 increases the black luminance in the 90° angle direction due to the light L5, and therefore can reduce crosstalk between two images. The amount of the light L5 can be adjusted by changing the size of the opening 76c3. In the present embodiment, the opening 76c3 is provided so as to bridge over the pixels Vpix(R) and Vpix(B2). However, the opening 76c3 may be provided on the top layer of the pixel Vpix(R) or the top layer of the pixel Vpix(B2).

In a portion of the black matrix 76a1, which extends across the pixels Vpix(G) and Vpix(B1), the opening 76c1 is provided where a light blocking layer is not formed. The light L6, having entered a boundary portion between the pixels Vpix (G) and Vpix(B1) from the backlight 101, passes through the opening 76c1 and the opening 33a, and is emitted as the light L7 in the −90° angle direction.

The display panel 1 increases the black luminance in the −90° angle direction due to the light L7, and therefore can reduce crosstalk between two images. The amount of the light L7 can be adjusted by changing the size of the opening 76c1. In the present embodiment, the opening 76c1 is provided so as to bridge over the pixels Vpix(G) and Vpix(B1). However, the opening 76c1 may be provided on the top layer of the pixel Vpix(G) or the top layer of the pixel Vpix(B1).

Figure 19:
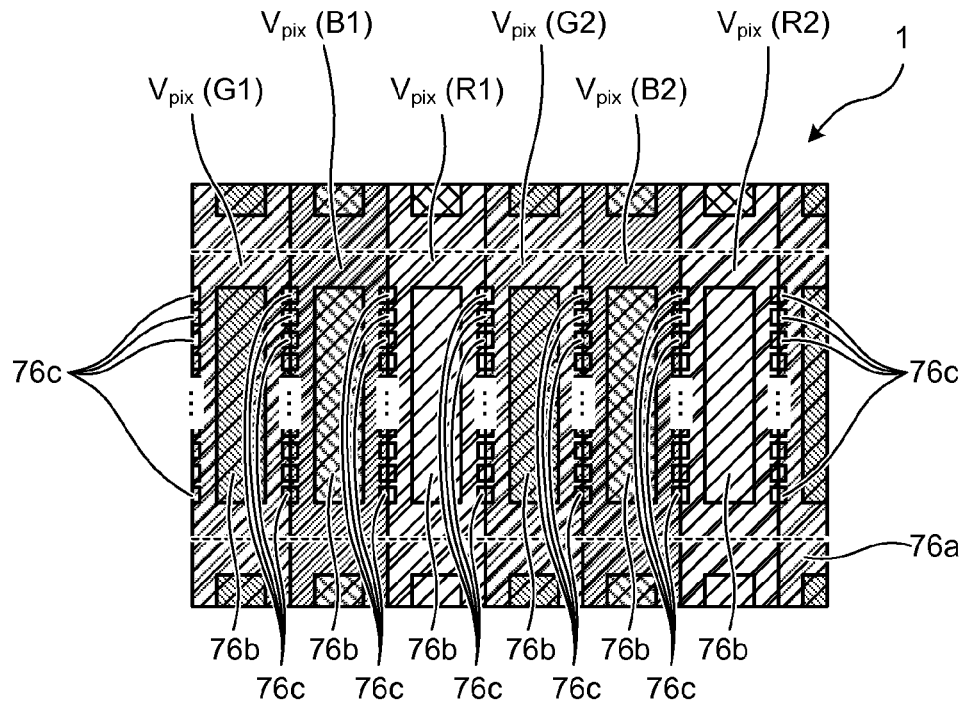
FIG. 19 is a plan view illustrating the display panel according to the first embodiment.

FIG. 19 is a plan view illustrating the display panel according to the first embodiment. FIG. 19 does not illustrate a parallax barrier for the sake of easy understanding. The display panel 1 includes the pixels Vpix(G1), Vpix(B1), Vpix (R1), Vpix(G2), Vpix(B2), and Vpix(R2) that extend longitudinally in the vertical direction in FIG. 19, and that are adjacent to each other in the left-right direction in FIG. 19.

As illustrated in FIG. 19, the black matrix 76a is formed so as to cover the outer periphery of each of the pixels Vpix(G1), Vpix(B1), Vpix(R1), Vpix(G2), Vpix(B2), and Vpix(R2).

That is, the black matrix 76a has a lattice-like shape by disposing at boundaries of the tow dimensionally arrayed pixels Vpix.

In a portion of the black matrix 76a, which extends across the pixels Vpix(G1) and Vpix(B1), a plurality of openings 76c are disposed in the longitudinal direction of the pixels Vpix (G1) and Vpix(B1). Similarly, in a portion of the black matrix 76a, which extends across the pixels Vpix(B1) and Vpix(R1), which extends across the pixels Vpix(R1) and Vpix(G2), which extends across the pixels Vpix(G2) and Vpix(B2), and which extends across the pixels Vpix(B2) and Vpix(R2), the openings 76c are arrayed in the longitudinal direction of the pixels Vpix(G1) and Vpix(B1). The amount of light that passes through the openings 76c and is emitted in the normal direction of the display panel 1 can be adjusted by changing the size and the number of the openings 76c. In the present embodiment, each of the openings 76c is provided so as to bridge over from one pixel to another pixel. However, each of the openings 76c may be provided on the top layer of either pixel.

In the display panel 1 according to the first embodiment, by providing the openings 76c, light can be emitted in the normal direction (the 0° angle direction) of the display panel 1, in the 90° angle direction thereof, and in the −90° angle direction thereof. Therefore, the display panel 1 can increase the black luminance and reduce crosstalk between two images.

Figure 20:
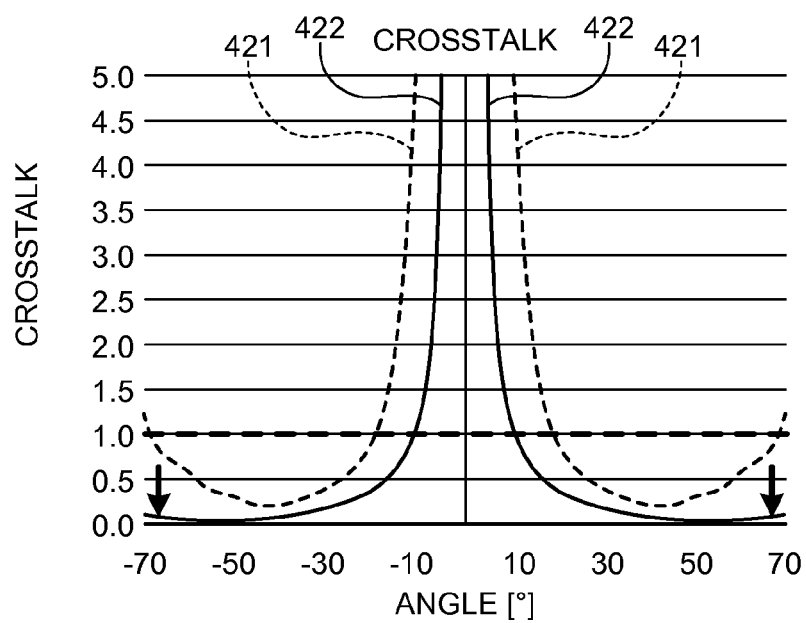
FIG. 20 is a graph illustrating a simulation result of crosstalk in a case where an opening is not provided on a black matrix and a case where an opening is provided on a black matrix.

FIG. 20 is a graph illustrating simulation results of crosstalk in a case where an opening is not provided on a black matrix and a case where an opening is provided on a black matrix. In FIG. 20, the horizontal axis represents the angle from the display panel 1 when the angle in the normal direction of the display panel 1 is defined as 0°. The angle from the display panel 1 in the counterclockwise direction (on the side of the viewer 211) is represented as a minus angle. The angle from the display panel 1 in the clockwise direction (on the side of the viewer 212) is represented as a plus angle. The vertical axis represents the crosstalk. A line 421 indicates the crosstalk in a case where an opening is not provided on a black matrix. A line 422 indicates the crosstalk in a case where an opening is provided on a black matrix. As illustrated in FIG. 20, the crosstalk can be reduced in a wide angle range by providing an opening on a black matrix.

As explained above by the formula (4), it is preferable that the crosstalk is equal to or smaller than 1. That is, when the black luminance is increased to the luminance of diffracted light or higher, desirable crosstalk can be obtained and crosstalk on the wide-angle side is improved. When the black luminance is increased excessively, the contrast at the eye-points (the eye positions of the viewers 211 and 212) is reduced. Therefore, it is preferable that the black luminance is increased to the same level as diffracted light. In other words, it is preferable that the crosstalk becomes approximately 1. The black luminance can be adjusted by changing the size and the number of the openings 76c.

First Modification of First Embodiment

In the first embodiment, an opening is provided on a black matrix to increase the black luminance. However, the black matrix may be formed as a thin film or may be made of a material with high light transmission, in order to increase the black luminance.

Figure 21:
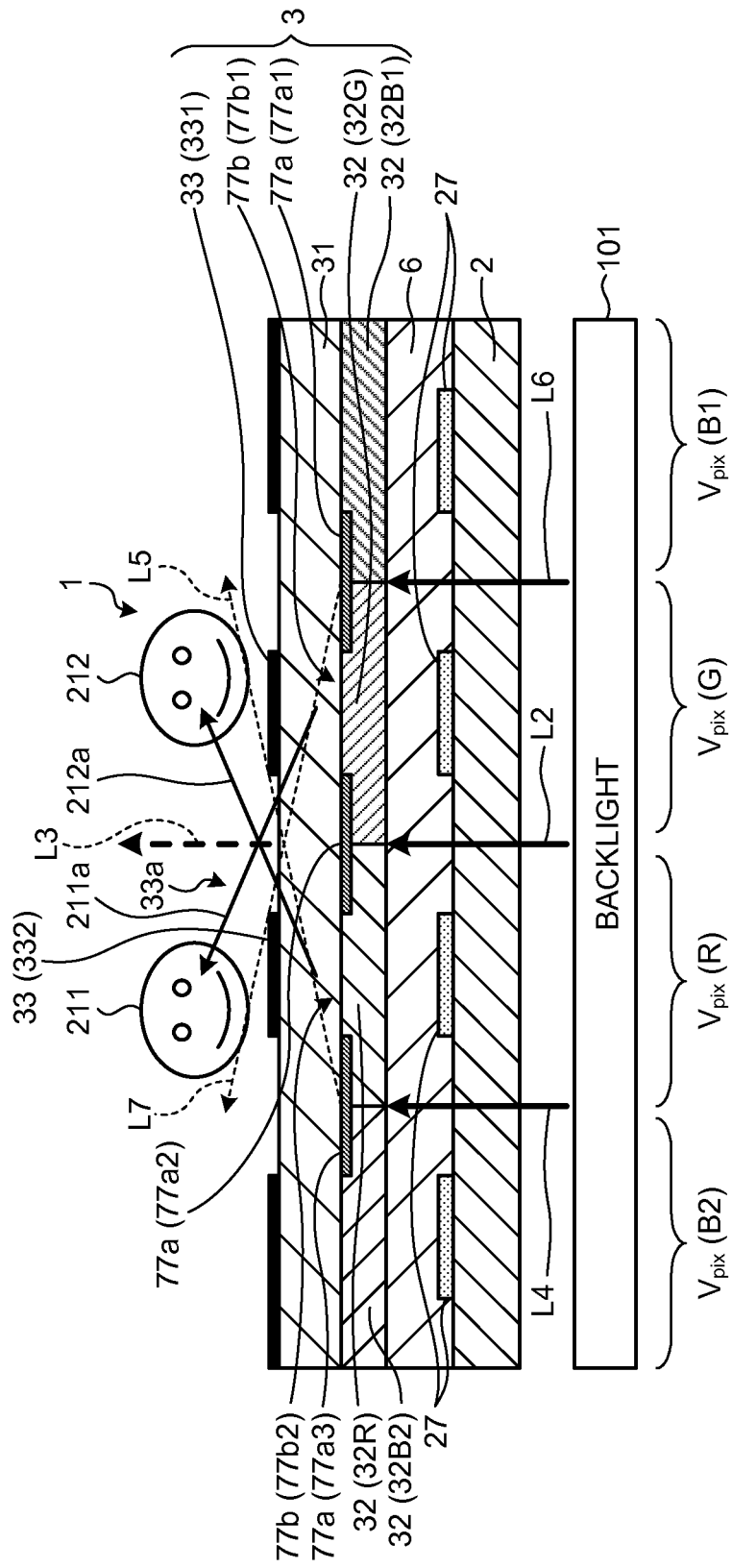
FIG. 21 is a cross-sectional view illustrating a display panel according to a first modification of the first embodiment.

FIG. 21 is a cross-sectional view illustrating a display panel according to a first modification of the first embodiment. FIG. 21 illustrates four adjacent pixels of the display panel 1 according to the first modification. From the right side to the left side in FIG. 21, the blue (B) pixel Vpix(B1), the green (G) pixel Vpix(G), the red (R) pixel Vpix(R), and the blue (B) pixel Vpix(B2) are positioned. The pixel Vpix(B1) and the pixel Vpix(G) are adjacent to each other. The pixel Vpix(G) and the pixel Vpix(R) are adjacent to each other. The pixel Vpix(R) and the pixel Vpix(B2) are adjacent to each other. Each of the pixels Vpix(B1), Vpix(G), Vpix(R), and Vpix(B2) includes the pixel electrode 27 on the front surface of the TFT substrate 2 (on the surface on the side of the counter substrate 3).

The liquid crystal 6 modulates light passing therethrough, depending on a state of an electric field between the pixel electrode 27 and the common electrode VCOM (see FIG. 5). Various modes of liquid crystal such as TN, VA, ECB, FFS, and IPS may be used.

Respective alignment films are provided between the liquid crystal 6 and the TFT substrate 2 and between the liquid crystal 6 and the counter substrate 3. An incident-side polarization plate can also be arranged on the back-surface side of the TFT substrate 2.

The pixel Vpix(R) includes the red (R) color filter 32R on the back surface of the glass substrate 31 (on the surface on the side of the TFT substrate 2). The pixel Vpix(G) includes the green (G) color filter 32G on the back surface of the glass substrate 31. The pixel Vpix(B1) includes the blue (B) color filter 32B1 on the back surface of the glass substrate 31. The pixel Vpix(B2) includes the blue (B) color filter 32B2 on the back surface of the glass substrate 31. On the back surface of the glass substrate 31 and at a portion bridging over the pixels Vpix(G) and Vpix(B1), a black matrix 77a1 is formed as a light blocking layer. On the back surface of the glass substrate 31 and at a portion bridging over the pixels Vpix(R) and Vpix(G), a black matrix 77a2 is formed as a light blocking layer. On the back surface of the glass substrate 31 and at a portion bridging over the pixels Vpix(R) and Vpix(B2), a black matrix 77a3 is formed as a light blocking layer. An opening 77b1, in which a light blocking layer is not formed, is defined between the black matrix 77a1 and the black matrix 77a2. An opening 77b2, in which a light blocking layer is not formed, is defined between the black matrix 77a2 and the black matrix 77a3. Light having entered from the backlight 101 into the display panel 1 can pass through the opening 77b1 and the opening 77b2.

The black matrixes 77a1, 77a2, and 77a3 are formed from chromium (Cr) metal, chromium oxide ($CrO_2$), and resin, for example. In a case where the black matrixes 77a1, 77a2, and 77a3 are formed from chromium (Cr) metal, the OD (optical density) value may be approximately 3 to 4, that is, the light transmission rate may become approximately 0.1% to 0.01%. In a case where the black matrixes 77a1, 77a2, and 77a3 are formed from resin, the OD value may be approximately 4 to 5, that is, the light transmission rate may become approximately 0.01% to 0.001%.

On the front surface of the glass substrate 31 (the surface on the opposite side to the TFT substrate 2) and at the center portion of the pixel Vpix(G), the parallax barrier 331 is formed as a light blocking layer. On the front surface of the glass substrate 31 and at the center portion of the pixel Vpix (R), the parallax barrier 332 is formed as a light blocking layer. The parallax barriers 331 and 332 are formed from a material with a high light-absorption rate, such as chromium (Cr) metal, chromium oxide ($CrO_2$), and resin. On the front surface of the glass substrate 31, a portion bridging over the pixels Vpix(R) and Vpix(G) is the opening 33a in which a light blocking layer is not formed.

Light having passed through the opening 77b1 of the pixel Vpix(G) passes through the opening 33a along the direction of the arrow 211a, and reaches the viewer 211. The light having passed through the opening 77b1 of the pixel Vpix(G) is blocked by the parallax barrier 331, and therefore does not reach the viewer 212 except the diffracted light described above. Light having passed through the opening 77b2 of the pixel Vpix(R) passes through the opening 33a along the direction of the arrow 212a, and reaches the viewer 212. The light having passed through the opening 77b2 of the pixel Vpix(R) is blocked by the parallax barrier 332, and therefore does not reach the viewer 211 except the diffracted light described above. Therefore, the display panel 1 can show separate images to the viewers 211 and 212.

Since the black matrix 77a2 is made of a material with high light transmission, a part of the light L2, having entered a boundary portion between the pixels Vpix(R) and Vpix(G) from the backlight 101, is transmitted through the black matrix 77a2, passes through the opening 33a, and is emitted as the light L3 in the normal direction (the 0° angle direction) of the display panel 1.

The display panel 1 increases the black luminance in the normal direction (the 0° angle direction) due to the light L3, and therefore can reduce crosstalk between two images. The amount of the light L3 can be adjusted by changing the OD value of the black matrix 77a2.

Since the black matrix 77a3 is made of a material with high light transmission, a part of the light L4, having entered a boundary portion between the pixels Vpix(R) and Vpix(B2) from the backlight 101, is transmitted through the black matrix 77a3, passes through the opening 33a, and is emitted as the light L5 in the 90° angle direction of the display panel 1.

The display panel 1 increases the black luminance in the 90° angle direction due to the light L5, and therefore can reduce crosstalk between two images. The amount of the light L5 can be adjusted by changing the OD value of the black matrix 77a3.

Since the black matrix 77a1 is made of a material with high light transmission, a part of the light L6, having entered a boundary portion between the pixels Vpix(G) and Vpix(B1) from the backlight 101, is transmitted through the black matrix 77a1, passes through the opening 33a, and is emitted as the light L7 in the −90° angle direction of the display panel 1.

The display panel 1 increases the black luminance in the −90° angle direction due to the light L7, and therefore can reduce crosstalk between two images. The amount of the light L7 can be adjusted by changing the OD value of the black matrix 77a1.

In the display panel 1 according to the first modification, since each of the black matrixes 77a1, 77a2, and 77a3 is made of a material with high light transmission, the light L3 can be emitted in the normal direction (the 0° angle direction) of the display panel 1, the light L5 can be emitted in the 90° angle direction thereof, and the light L7 can be emitted in the −90° angle direction thereof. Therefore, the display panel 1 can increase the black luminance and reduce crosstalk between two images.

As explained above by the formula (4), it is preferable that the crosstalk is equal to or smaller than 1. That is, when the black luminance is increased to the luminance of diffracted light or higher, desirable crosstalk can be obtained and crosstalk on the wide-angle side is improved. When the black luminance is increased excessively, the contrast at the eye-points (the eye positions of the viewers 211 and 212) is reduced. Therefore, it is preferable that the black luminance is increased to the same level as diffracted light. In other words, it is preferable that the crosstalk becomes approximately 1.

The black luminance can be adjusted by changing the OD value of the black matrixes 77a1, 77a2, and 77a3.

The black matrixes 77a1, 77a2, and 77a3 may be formed as thin films of materials with low light transmission, instead of being made of materials with high light transmission. As described above, by forming the black matrixes 77a1, 77a2, and 77a3 as thin films, the light L3 can be emitted in the normal direction of the display panel 1, the light L5 can be emitted in the 90° angle direction thereof, and the light L7 can be emitted in the −90° angle direction thereof. Therefore, the display panel 1 can increase the black luminance and reduce crosstalk between two images. The black luminance can be adjusted by changing the film thickness of the black matrixes 77a1, 77a2, and 77a3.

Second Modification of First Embodiment

In the first embodiment, an opening is provided on a black matrix to increase the black luminance. In the first modification of the first embodiment, a black matrix is formed as a thin film or made of a material with high light transmission to increase the black luminance. The black luminance can be further increased by forming no color filter underneath the black matrix.

Figure 22:
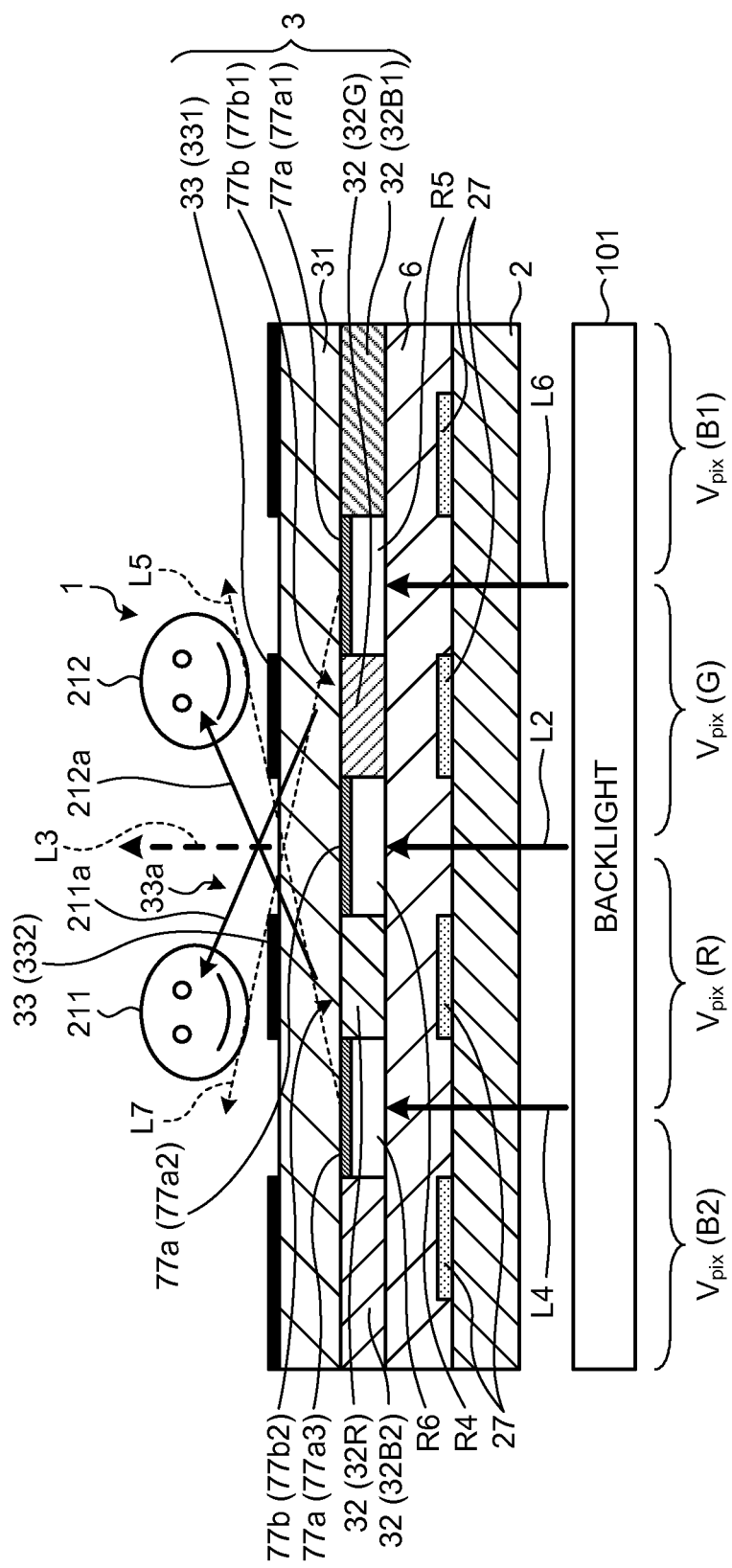
FIG. 22 is a cross-sectional view illustrating a display panel according to a second modification of the first embodiment.

FIG. 22 is a cross-sectional view illustrating a display panel according to a second modification of the first embodiment. FIG. 22 illustrates four adjacent pixels of the display panel 1 according to the second modification. From the right side to the left side in FIG. 22, the blue (B) pixel Vpix(B1), the green (G) pixel Vpix(G), the red (R) pixel Vpix(R), and the blue (B) pixel Vpix(B2) are positioned. The pixel Vpix(B1) and the pixel Vpix(G) are adjacent to each other. The pixel Vpix(G) and the pixel Vpix(R) are adjacent to each other. The pixel Vpix(R) and the pixel Vpix(B2) are adjacent to each other. Each of the pixels Vpix(B1), Vpix(G), Vpix(R), and Vpix(B2) includes the pixel electrode 27 on the front surface of the TFT substrate 2 (on the surface on the side of the counter substrate 3).

The liquid crystal 6 modulates light passing therethrough, depending on a state of an electric field between the pixel electrode 27 and the common electrode VCOM (see FIG. 5). Various modes of liquid crystal such as TN, VA, ECB, FFS, and IPS may be used.

Respective alignment films are provided between the liquid crystal 6 and the TFT substrate 2 and between the liquid crystal 6 and the counter substrate 3. An incident-side polarization plate can also be arranged on the back-surface side of the TFT substrate 2.

The pixel Vpix(R) includes the red (R) color filter 32R on the back surface of the glass substrate 31 (on the surface on the side of the TFT substrate 2). The pixel Vpix(G) includes the green (G) color filter 32G on the back surface of the glass substrate 31. The pixel Vpix(B1) includes the blue (B) color filter 32B1 on the back surface of the glass substrate 31. The pixel Vpix(B2) includes the blue (B) color filter 32B2 on the back surface of the glass substrate 31. On the back surface of the glass substrate 31 and at a portion bridging over the pixels Vpix(G) and Vpix(B1), the black matrix 77a1 is formed as a light blocking layer. On the back surface of the glass substrate 31 and at a portion bridging over the pixels Vpix(R) and Vpix(G), the black matrix 77a2 is formed as a light blocking layer. On the back surface of the glass substrate 31 and at a portion bridging over the pixels Vpix(R) and Vpix(B2), the black matrix 77a3 is formed as a light blocking layer. The opening 77b1, in which a light blocking layer is not formed, is defined between the black matrix 77a1 and the black matrix 77a2. The opening 77b2, in which a light blocking layer is not formed, is defined between the black matrix 77a2 and the black matrix 77a3. Light having entered from the backlight 101 into the display panel 1 can pass through the opening 77b1 and the opening 77b2.

The black matrixes 77a1, 77a2, and 77a3 are formed from chromium (Cr) metal, chromium oxide ($CrO_2$), and resin, for example. In a case where the black matrixes 77a1, 77a2, and 77a3 are formed from chromium (Cr) metal, the OD value (optical density) may be approximately 3 to 4, that is, the light transmission rate may become approximately 0.1% to 0.01%. In a case where the black matrixes 77a1, 77a2, and 77a3 are formed from resin, the OD value may be approximately 4 to 5, that is, the light transmission rate may become approximately 0.01% to 0.001%.

On the front surface of the glass substrate 31 (the surface on the opposite side to the TFT substrate 2) and at the center portion of the pixel Vpix(G), the parallax barrier 331 is formed as a light blocking layer. On the front surface of the glass substrate 31 and at the center portion of the pixel Vpix(R), the parallax barrier 332 is formed as a light blocking layer. The parallax barriers 331 and 332 are formed from a material with a high light-absorption rate, such as chromium (Cr) metal, chromium oxide ($CrO_2$), and resin. On the front surface of the glass substrate 31, a portion bridging over the pixels Vpix(R) and Vpix(G) is the opening 33a in which a light blocking layer is not formed.

Light having passed through the opening 77b1 of the pixel Vpix(G) passes through the opening 33a along the direction of the arrow 211a, and reaches the viewer 211. The light having passed through the opening 77b1 of the pixel Vpix(G) is blocked by the parallax barrier 331, and therefore does not reach the viewer 212 except the diffracted light described above. Light having passed through the opening 77b2 of the pixel Vpix(R) passes through the opening 33a along the direction of the arrow 212a, and reaches the viewer 212. The light having passed through the opening 77b2 of the pixel Vpix(R) is blocked by the parallax barrier 332, and therefore does not reach the viewer 211 except the diffracted light described above. Therefore, the display panel 1 can show separate images to the viewers 211 and 212.

The color filters 32R and 32G are not formed in a region R4 on the layer below the black matrix 77a2. The black matrix 77a2 is made of a material with high light transmission. Therefore, a part of the light L2, having entered from the backlight 101 into a boundary portion of the pixels Vpix(R) and Vpix(G), passes through the region R4, is transmitted through the black matrix 77a2, passes through the opening 33a, and is emitted as the light L3 in the normal direction (the 0° angle direction) of the display panel 1.

The display panel 1 increases the black luminance in the normal direction (the 0° angle direction) due to the light L3, and therefore can reduce crosstalk between two images. The amount of the light L3 can be adjusted by changing the OD value of the black matrix 77a2.

The color filters 32R and 32B2 are not formed in a region R6 on the layer below the black matrix 77a3. The black matrix 77a3 is made of a material with high light transmission. Therefore, a part of the light L4, having entered from the backlight 101 into a boundary portion of the pixels Vpix(R) and Vpix(B2), passes through the region R6, is transmitted through the black matrix 77a3, passes through the opening 33a, and is emitted as the light L5 in the 90° angle direction of the display panel 1.

The display panel 1 increases the black luminance in the 90° angle direction due to the light L5, and therefore can reduce crosstalk between two images. The amount of the light L5 can be adjusted by changing the OD value of the black matrix 77a3.

The color filters 32G and 32B1 are not formed in a region R5 on the layer below the black matrix 77a1. The black matrix 77a1 is made of a material with high light transmission. Therefore, a part of the light L6, having entered from the backlight 101 into a boundary portion of the pixels Vpix(G) and Vpix(B1), passes through the region R5, is transmitted through the black matrix 77a1, passes through the opening 33a, and is emitted as the light L7 in the −90° angle direction of the display panel 1.

The display panel 1 increases the black luminance in the −90° angle direction due to the light L7, and therefore can reduce crosstalk between two images. The amount of the light L7 can be adjusted by changing the OD value of the black matrix 77a1.

In the display panel 1 according to the second modification, the color filters 32R and 32G are not formed in the region R4 that is the layer below the black matrix 77a2, the color filters 32R and 32B2 are not formed in the region R6 that is the layer below the black matrix 77a3, and the color filters 32G and 32B1 are not formed in the region R5 that is the layer below the black matrix 77a1, and also the black matrixes 77a1, 77a2, and 77a3 are made of a material with high light transmission. Therefore, the light L3 can be emitted in the normal direction (the 0° angle direction) of the display panel 1, the light L5 can be emitted in the 90° angle direction thereof, and the light L7 can be emitted in the −90° angle direction thereof. Accordingly, the display panel 1 can further increase the black luminance, and can reduce crosstalk between two images. The second modification is particularly effective in a case of large amount of diffracted light.

Because the color filters 32R and 32G are not formed in the region R4, the light L3 has a small amount of a red (R) component and a green (G) component. Because the color filters 32R and 32B2 are not formed in the region R6, the light L5 has a small amount of a red (R) component and a blue (B) component. Because the color filters 32G and 32B1 are not formed in the region R5, the light L7 has a small amount of a green (G) component and a blue (B) component. Therefore, the display panel 1 can improve the color reproducibility. In FIG. 22, the color filters 32R and 32G are not formed in the entire region R4. However, it suffices that the color filters 32R and 32G are not formed in at least a part of the region R4. In FIG. 22, the color filters 32R and 32B2 are not formed in the entire region R6. However, it suffices that the color filters 32R and 32B2 are not formed in at least a part of the region R6. In FIG. 22, the color filters 32G and 32B1 are not formed in the entire region R5. However, it suffices that the color filters 32G and 32B1 are not formed in at least a part of the region R5.

As explained above by the formula (4), it is preferable that the crosstalk is equal to or smaller than 1. That is, when the black luminance is increased to the luminance of diffracted light or higher, desirable crosstalk can be obtained and crosstalk on the wide-angle side is improved. When the black luminance is increased excessively, the contrast at the eyepoints (the eye positions of the viewers 211 and 212) is reduced. Therefore, it is preferable that the black luminance is increased to the same level as diffracted light, that is, the crosstalk becomes approximately 1. The black luminance can be adjusted by changing the OD value of the black matrixes 77a1, 77a2, and 77a3.

The black matrixes 77a1, 77a2, and 77a3 can be made of a material with low light transmission and also be thinned, instead of being made of a material with high light transmission. As described above, by thinning the black matrixes 77a1, 77a2, and 77a3, the light L3 can be emitted in the normal direction (the 0° angle direction) of the display panel 1, the light L5 can be emitted in the 90° angle direction of the display panel 1, and the light L7 can be emitted in the −90° angle direction of the display panel 1. Therefore, the display panel 1 can increase the black luminance and reduce crosstalk between two images. The black luminance can be adjusted by changing the film thickness of the black matrixes 77a1, 77a2, and 77a3.

In the first embodiment (FIG. 18), it is possible that no color filter is disposed underneath the black matrixes 76a1, 76a2, and 76a3. In this case, it is sufficient that any color filter is not formed in a region at least on the layer below the opening 76c2 of the black matrix 76a2, on the layer below the opening 76c1 of the black matrix 76a1, and on the layer below the opening 76c3 of the black matrix 76a3 in plan view. With this configuration, the display panel 1 can further increase the black luminance, and can reduce crosstalk between two images. Since any color filter is not formed on the layer below the black matrix 76a2, the light L3 has a small amount of a red (R) component and a green (G) component. Since any color filter is not formed on the layer below the black matrix 76a3, the light L5 has a small amount of a red (R) component and a blue (B) component. Since any color filter is not formed on the layer below the black matrix 76a1, the light L7 has a small amount of a green (G) component and a blue (B) component. Therefore, the display panel 1 can improve the color reproducibility.

Second Embodiment

Figure 23:
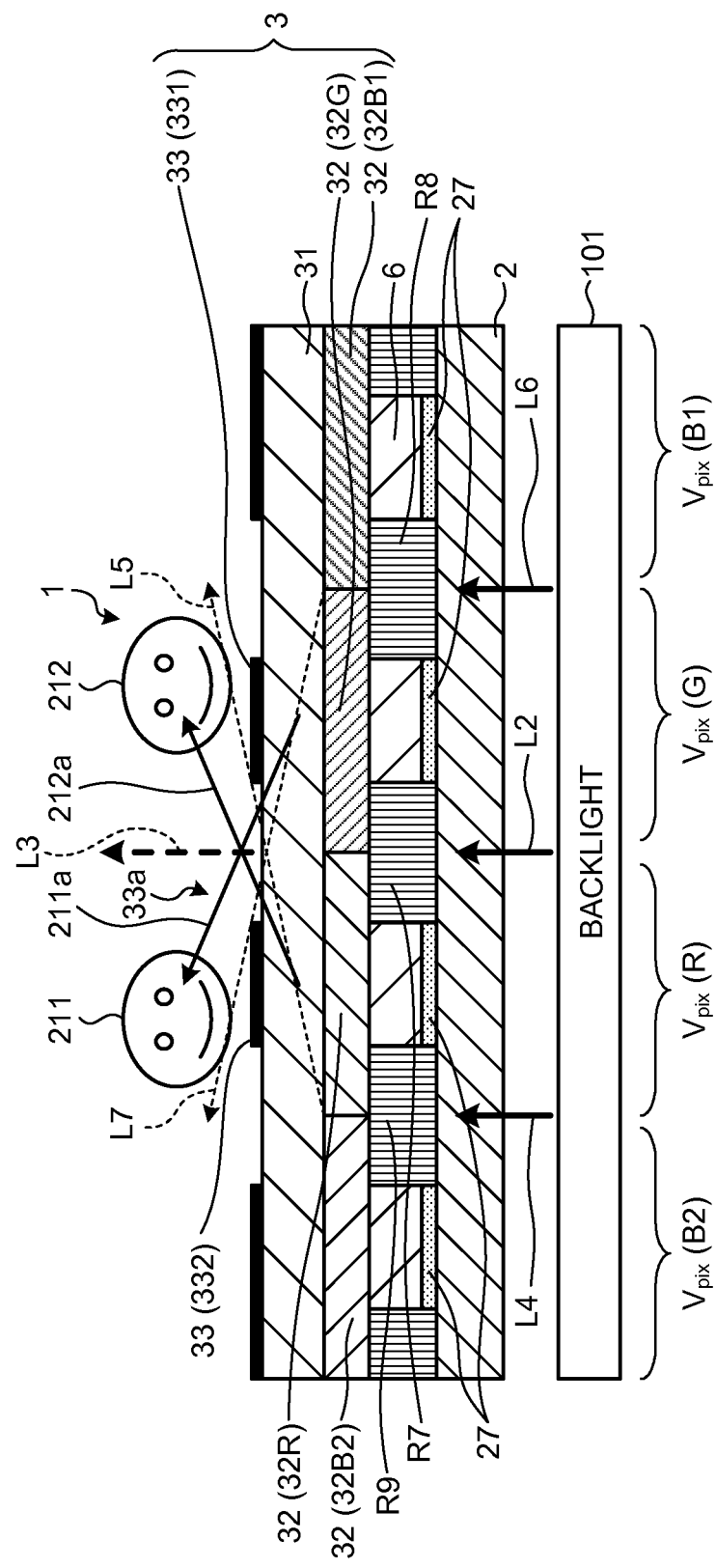
FIG. 23 is a cross-sectional view illustrating a display panel according to a second embodiment.

FIG. 23 is a cross-sectional view illustrating a display panel according to a second embodiment. FIG. 23 illustrates four adjacent pixels of the display panel 1 according to the second embodiment. From the right side to the left side in FIG. 23, the blue (B) pixel Vpix(B1), the green (G) pixel Vpix(G), the red (R) pixel Vpix(R), and the blue (B) pixel Vpix(B2) are positioned. The pixel Vpix(B1) and the pixel Vpix(G) are adjacent to each other. The pixel Vpix(G) and the pixel Vpix(R) are adjacent to each other. The pixel Vpix(R) and the pixel Vpix(B2) are adjacent to each other. Each of the pixels Vpix(B1), Vpix(G), Vpix(R), and Vpix(B2) includes the pixel electrode 27 on the front surface of the TFT substrate 2 (on the surface on the side of the counter substrate 3).

The liquid crystal 6 modulates light passing therethrough, depending on a state of an electric field between the pixel electrode 27 and the common electrode VCOM (see FIG. 5). In the second embodiment, the liquid crystal 6 is configured to be a normally black mode. That is, a light transmission becomes minimum rate and a so-called "black display" is obtained when no electric voltage is applied between the pixel electrode 27 and the common electrode VCOM. Liquid crystal modes such as VA and IPS may be used.

Respective alignment films are provided between the liquid crystal 6 and the TFT substrate 2 and between the liquid crystal 6 and the counter substrate 3. An incident-side polarization plate may also be arranged on the back-surface side of the TFT substrate 2.

The pixel Vpix(R) includes the red (R) color filter 32R on the back surface of the glass substrate 31 (on the surface on the side of the TFT substrate 2). The pixel Vpix(G) includes the green (G) color filter 32G on the back surface of the glass substrate 31. The pixel Vpix(B1) includes the blue (B) color filter 32B1 on the back surface of the glass substrate 31. The pixel Vpix(B2) includes the blue (B) color filter 32B2 on the back surface of the glass substrate 31.

On the front surface of the glass substrate 31 (the surface on the opposite side to the TFT substrate 2) and at the center portion of the pixel Vpix(G), the parallax barrier 331 is formed as a light blocking layer. On the front surface of the glass substrate 31 and at the center portion of the pixel Vpix (R), the parallax barrier 332 is formed as a light blocking layer. The parallax barriers 331 and 332 are formed from a material with a high light-absorption rate, such as chromium (Cr) metal, chromium oxide ($CrO_2$), and resin. On the front surface of the glass substrate 31, a portion bridging over the pixels Vpix(R) and Vpix(G) is the opening 33a in which a light blocking layer is not formed.

Light having passed through the pixel Vpix(G) passes through the opening 33a along the direction of the arrow 211a, and reaches the viewer 211. The light having passed through the pixel Vpix(G) is blocked by the parallax barrier 331, and therefore does not reach the viewer 212 except the diffracted light described above. Light having passed through the pixel Vpix(R) passes through the opening 33a along the direction of the arrow 212a, and reaches the viewer 212. The light having passed through the pixel Vpix(R) is blocked by the parallax barrier 332, and therefore does not reach the viewer 211 except the diffracted light described above. Therefore, the display panel 1 can show separate images to the viewers 211 and 212.

As illustrated in FIG. 23, the display panel 1 according to the second embodiment is different from the display panel 1 according to the first embodiment such that a black matrix is not formed at a boundary portion of the pixels Vpix(R) and Vpix(G).

As explained above, the liquid crystal 6 is of normally black. The liquid crystal 6 within a region R7 bridging over the pixels Vpix(R) and Vpix(G) blocks the major portion of the light L2 entering the region R7 from the backlight 101, since the region R7 has no pixel electrode and thus no or very little electric field exists in the region R7. However, the liquid crystal 6 within the region R7 passes a part of the light L2 entering the region R7 from the backlight 101. A black matrix is not formed above the region R7. Therefore, the display panel 1 emits a part of the light L2 having entered from the backlight 101 as the light L3.

The display panel 1 increases the black luminance in the normal direction (the 0° angle direction) due to the light L3, and therefore can reduce crosstalk between two images.

As illustrated in FIG. 23, the display panel 1 according to the second embodiment is different from the display panel 1 according to the first embodiment such that a black matrix is not formed at a boundary portion of the pixels Vpix(R) and Vpix(B2).

As explained above, the liquid crystal 6 is of normally black. The liquid crystal 6 within a region R9 bridging over the pixels Vpix(R) and Vpix(B2) blocks the major portion of the light L4 entering the region R9 from the backlight 101, since the region R9 has no pixel electrode and thus no or very little electric field exists in the region R9. However, the liquid crystal 6 within the region R9 passes a part of the light L4 entering the region R9 from the backlight 101. A black matrix is not formed above the region R9. Therefore, the display panel 1 emits a part of the light L4 having entered from the backlight 101 as the light L5 in the 90° angle direction of the display panel 1.

The display panel 1 increases the black luminance in the 90° angle direction due to the light L5, and therefore can reduce crosstalk between two images.

As illustrated in FIG. 23, the display panel 1 according to the second embodiment is different from the display panel 1 according to the first embodiment such that a black matrix is not formed at a boundary portion of the pixels Vpix(G) and Vpix(B1).

As explained above, the liquid crystal 6 is of normally black. The liquid crystal 6 within a region R8 bridging over the pixels Vpix(G) and Vpix(B1) blocks the major portion of the light L6 entering the region R8 from the backlight 101, since the region R8 has no pixel electrode and thus no or very little electric fields exists in the region R8. However, the liquid crystal 6 within the region R8 passes a part of the light L6 entering the region R8 from the backlight 101. A black matrix is not formed above the region R8. Therefore, the display panel 1 emits a part of the light L6 having entered from the backlight 101 as the light L7 in the −90° angle direction of the display panel 1.

The display panel 1 increases the black luminance in the −90° angle direction due to the light L7, and therefore can reduce crosstalk between two images.

Figure 24:
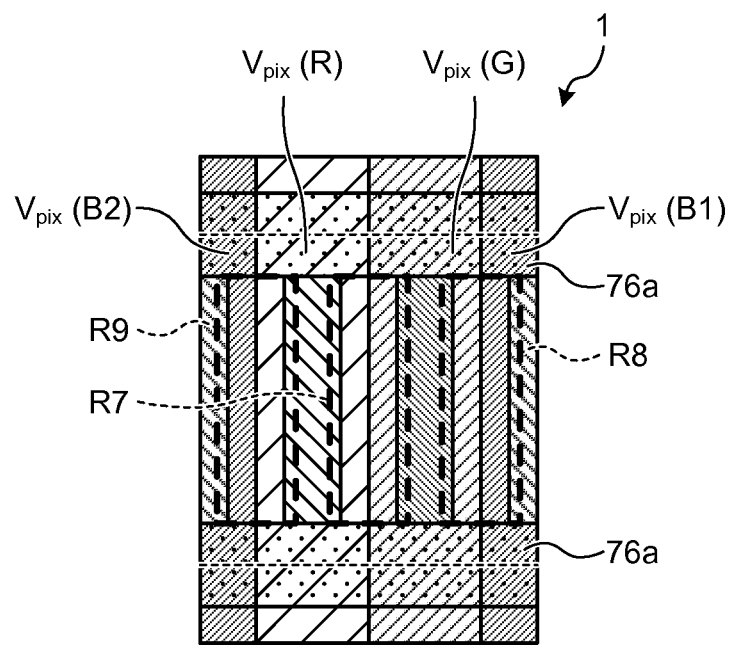
FIG. 24 is a plan view illustrating the display panel according to the second embodiment.

FIG. 24 is a plan view illustrating the display panel according to the second embodiment. FIG. 24 does not illustrate a parallax barrier for the sake of easy understanding. The display panel 1 includes the pixels Vpix(B1), Vpix(G), Vpix(R), and Vpix(B2) that extend longitudinally in the vertical direction in FIG. 24.

As illustrated in FIG. 24, the black matrix 76a is formed so as to cover the short side of each of the pixels Vpix(B1), Vpix(G), Vpix(R), and Vpix(B2). That is, the black matrix 76a is arranged so as to extend in the lateral direction (in the left-right direction in FIG. 24) of the pixels Vpix(B1), Vpix(G), Vpix(R), and Vpix(B2), and therefore has a stripe shape.

In the display panel 1 according to the second embodiment, when the liquid crystal 6 is of normally black, the light L3 can be emitted in the normal direction (the 0° angle direction) of the display panel 1, the light L5 can be emitted in the 90° angle direction of the display panel 1, and the light L7 can be emitted in the −90° angle direction of the display panel 1. Thereby, the display panel 1 can increase the black luminance and reduce crosstalk between two images.

Modification of Second Embodiment

In the second embodiment, a liquid crystal is of normally black and a black matrix is not formed, in order to increase the black luminance. The black luminance can be further increased by forming no color filter at a boundary portion between adjacent pixels.

Figure 25:
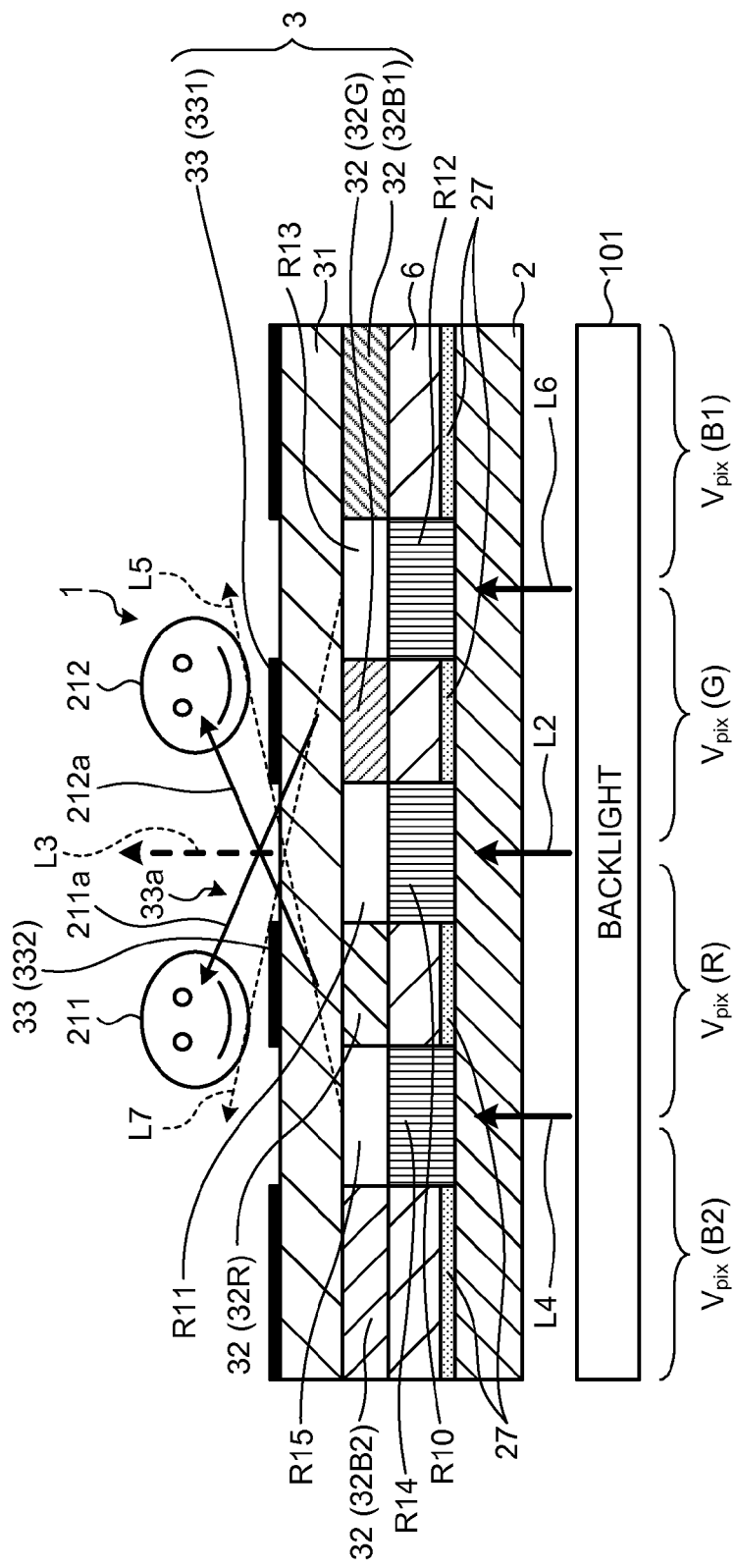
FIG. 25 is a cross-sectional view illustrating a display panel according to a modification of the second embodiment.

FIG. 25 is a cross-sectional view illustrating a display panel according to a modification of the second embodiment. FIG. 25 illustrates four adjacent pixels of the display panel 1 according to the modification. From the right side to the left side in FIG. 25, the blue (B) pixel Vpix(B1), the green (G) pixel Vpix(G), the red (R) pixel Vpix(R), and the blue (B) pixel Vpix(B2) are positioned. The pixel Vpix(B1) and the pixel Vpix(G) are adjacent to each other. The pixel Vpix(G) and the pixel Vpix(R) are adjacent to each other. The pixel Vpix(R) and the pixel Vpix(B2) are adjacent to each other. Each of the pixels Vpix(B1), Vpix(G), Vpix(R), and Vpix(B2) includes the pixel electrode 27 on the front surface of the TFT substrate 2 (on the surface on the side of the counter substrate 3).

The liquid crystal 6 modulates light passing therethrough, depending on a state of an electric field between the pixel electrode 27 and the common electrode VCOM (see FIG. 5). In the second embodiment, the liquid crystal 6 is configured to be a normally black mode. That is, a light transmission becomes minimum rate and a so-called "black display" is obtained when no electric voltage is applied between the pixel electrode 27 and the common electrode VCOM. Liquid crystal modes such as VA and IPS may be used.

Respective alignment films are provided between the liquid crystal 6 and the TFT substrate 2 and between the liquid crystal 6 and the counter substrate 3. An incident-side polarization plate may also be arranged on the back-surface side of the TFT substrate 2.

The pixel Vpix(R) includes the red (R) color filter 32R on the back surface of the glass substrate 31 (on the surface on the side of the TFT substrate 2). The pixel Vpix(G) includes the green (G) color filter 32G on the back surface of the glass substrate 31. The pixel Vpix(B1) includes the blue (B) color filter 32B1 on the back surface of the glass substrate 31. The pixel Vpix(B2) includes the blue (B) color filter 32B2 on the back surface of the glass substrate 31.

On the front surface of the glass substrate 31 (the surface on the opposite side to the TFT substrate 2) and at the center portion of the pixel Vpix(G), the parallax barrier 331 is formed as a light blocking layer. On the front surface of the glass substrate 31 and at the center portion of the pixel Vpix(R), the parallax barrier 332 is formed as a light blocking layer. The parallax barriers 331 and 332 are formed from a material with a high light-absorption rate, such as chromium (Cr) metal, chromium oxide ($CrO_2$), and resin. On the front surface of the glass substrate 31, a portion bridging over the pixels Vpix(R) and Vpix(G) is the opening 33a where a light blocking layer is not formed.

Light having passed through the pixel Vpix(G) passes through the opening 33a along the direction of the arrow 211a, and reaches the viewer 211. The light having passed through the pixel Vpix(G) is blocked by the parallax barrier 331, and therefore does not reach the viewer 212 except the diffracted light described above. Light having passed through the pixel Vpix(R) passes through the opening 33a along the direction of the arrow 212a, and reaches the viewer 212. The light having passed through the pixel Vpix(R) is blocked by the parallax barrier 332, and therefore does not reach the viewer 211 except the diffracted light described above. Therefore, the display panel 1 can show separate images to the viewers 211 and 212.

As explained above, the liquid crystal 6 is of normally black. The liquid crystal 6 within a region R10 bridging over the pixels Vpix(R) and Vpix(G) blocks the major portion of the light L2 entering the region R10 from the backlight 101, since the region R10 has no pixel electrode and thus no or very little electric field exists in the region R10. However, the liquid crystal 6 within the region R10 passes a part of the light L2 entering the region R10 from the backlight 101. Further, the color filters 32R and 32G are not formed in a region R11 of a layer above the region R10. Therefore, a part of the light L2, having entered the region R10 from the backlight 101 at a boundary portion of the pixels Vpix(R) and Vpix(G), is transmitted through the region R10, passes through the region R11, passes through the opening 33a, and is emitted as the light L3 in the normal direction (the 0° angle direction) of the display panel 1.

The display panel 1 increases the black luminance in the normal direction (the 0° angle direction) due to the light L3, and therefore can reduce crosstalk between two images.

The liquid crystal 6 within a region R14 bridging over the pixels Vpix(R) and Vpix(B2) blocks the major portion of the light L4 entering the region R14 from the backlight 101, since the region R14 has no pixel electrode and thus no or very little electric filed exists in the region R14. However, the liquid crystal 6 within the region R14 passes a part of the light L4 entering the region R14 from the backlight 101. Further, the color filters 32R and 32B2 are not formed in a region R15 of a layer above the region R14. Therefore, a part of the light L4, having entered the region R14 from the backlight 101 at a boundary portion between the pixels Vpix(R) and Vpix(B2), is transmitted through the region R14, passes through the region R15, passes through the opening 33a, and is emitted as the light L5 in the 90° angle direction of the display panel 1.

The display panel 1 increases the black luminance in the 90° angle direction due to the light L5, and therefore can reduce crosstalk between two images.

The liquid crystal 6 within a region R12 bridging over the pixels Vpix(G) and Vpix(B1) blocks the major portion of the light L6 entering the region R12 from the backlight 101, since the region R12 has no pixel electrode and thus no or very little electric field exists in the region R12. However, the liquid crystal 6 within the region R12 passes a part of the light L6 entering the region R12 from the backlight 101. Further, the color filters 32G and 32B1 are not formed in a region R13 of a layer above the region R12. Therefore, a part of the light L6, having entered the region R12 from the backlight 101 at a boundary portion between the pixels Vpix(G) and Vpix(B1), is transmitted through the region R12, passes through the region R13, passes through the opening 33a, and is emitted as the light L7 in the −90° angle direction of the display panel 1.

The display panel 1 increases the black luminance in the −90° angle direction due to the light L7, and therefore can reduce crosstalk between two images.

In the display panel 1 according to the modification, since the color filters 32R and 32G are not formed in the region R11, the amount of the light L3 emitted in the normal direction (the 0° angle direction) of the display panel 1 can be increased. Since the color filters 32R and 32B2 are not formed in the region R15, the amount of the light L5 emitted in the 90° angle direction of the display panel 1 can be increased. Since the color filters 32G and 32B1 are not formed in the region R13, the amount of the light L7 emitted in the −90° angle direction of the display panel 1 can be increased. Therefore, the display panel 1 can further increase the black luminance, and can reduce crosstalk between two images. The modification is particularly advantageous when an amount of the diffracted light is great.

Since the color filters 32R and 32G are not formed in the region R11, the light L3 has a small amount of a red (R) component and a green (G) component. Since the color filters 32R and 32B2 are not formed in the region R15, the light L5 has a small amount of a red (R) component and a blue (B) component. Since the color filters 32G and 32B1 are not formed in the region R13, the light L7 has a small amount of a green (G) component and a blue (B) component. Therefore, the display panel 1 can improve the color reproducibility, and can suppress contrast reduction. In FIG. 25, the color filters 32R and 32G are not formed in the entire region R11. However, a region where any color filters 32R and 32G are not formed may be a part of the region R11. Similarly, in FIG. 25, the color filters 32R and 32B2 are not formed in the entire region R15. However, a region where any color filters 32R and 32B2 may be a part of the region R15. Similarly, in FIG. 25, the color filters 32G and 32B1 are not formed in the entire region R13. However, a region where any color filters 32G and 32B1 may be a part of the region R13.

As explained above by the formula (4), it is preferable that the crosstalk is equal to or smaller than 1. That is, when the black luminance is increased to the luminance of diffracted light or higher, desirable crosstalk can be obtained and crosstalk on the wide-angle side is improved. When the black luminance is increased excessively, the contrast at the eye-points (the eye positions of the viewers 211 and 212) is reduced. Therefore, it is preferable that the black luminance is increased to the same level as diffracted light. In other words, it is preferable that the crosstalk becomes approximately 1.

2. Application Examples

Next, with reference to FIGS. 26 to 38, application examples of the display device explained in the above embodiments are explained. FIGS. 26 to 38 illustrate examples of an electronic apparatus to which the display device according to the above embodiments is applied. It is possible to apply the display device 100 according to the above embodiments to electronic apparatuses in any field, including a portable phone, a portable terminal device such as a smart phone, a television device, a digital camera, a laptop personal computer, a video camera, vehicle meters, and the like. In other words, it is possible to apply the display device 100 according to the above embodiments to electronic apparatuses in any field, which display a video signal input externally or a video signal generated internally as an image or a video. The electronic apparatuses include a control device that supplies a video signal to the display device to control an operation of the display device.

Application Example 1

Figure 26:
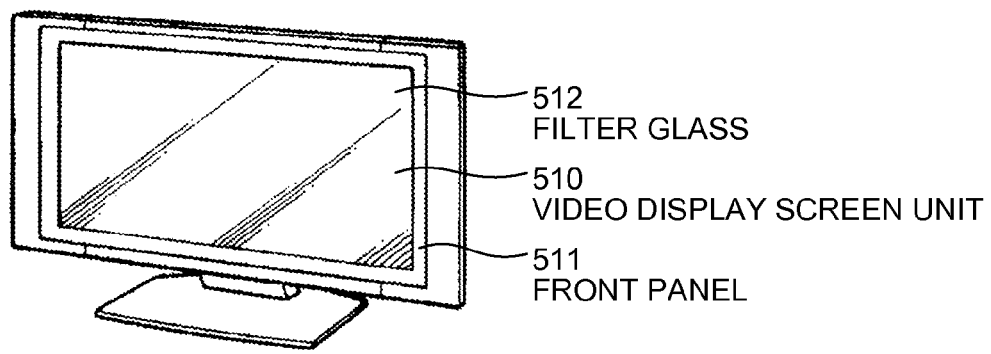
FIG. 26 is a perspective view illustrating an example of an electronic apparatus to which a display device with a touch detection function according to the embodiments is applied.

An electronic apparatus illustrated in FIG. 26 is a television device to which the display device 1 according to the above embodiments is applied. This television device includes a video display screen unit 510 that includes a front panel 511 and a filter glass 512, for example. The video display screen unit 510 is the display device according to the above embodiments.

Application Example 2

Figure 27:
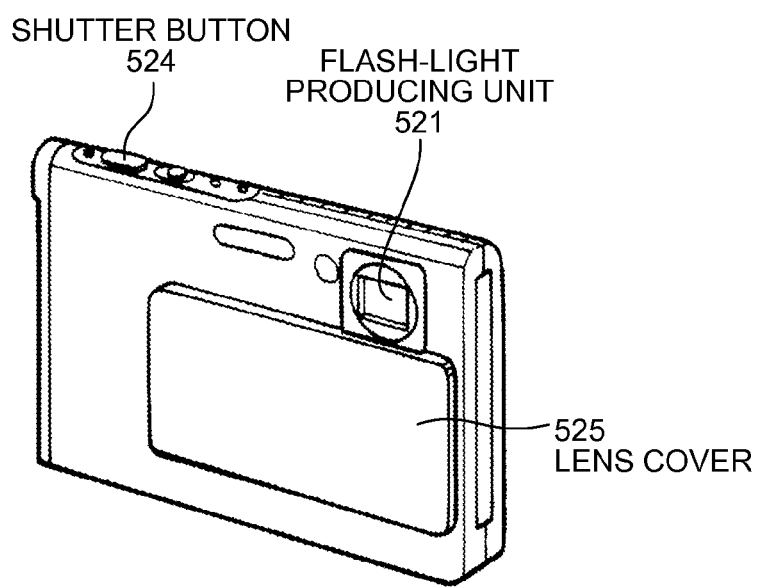
FIG. 27 is a perspective view illustrating an example of an electronic apparatus to which the display device according to the above embodiments is applied.
Figure 28:
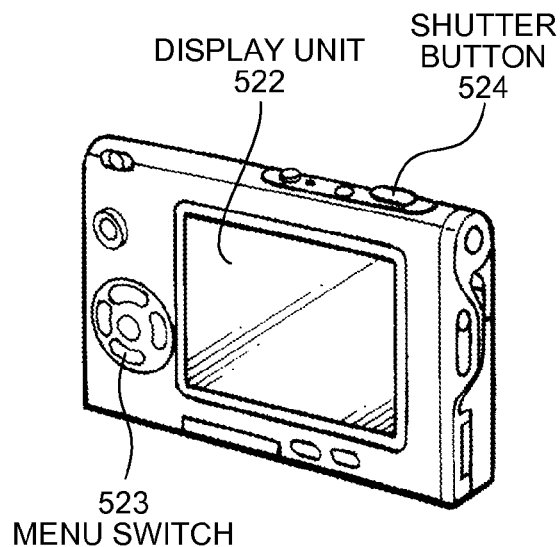
FIG. 28 is a perspective view illustrating an example of an electronic apparatus to which the display device according to the above embodiments is applied.

An electronic apparatus illustrated in FIGS. 27 and 28 is a digital camera to which the display device 1 according to the above embodiments is applied. This digital camera includes a flash-light producing unit 521, a display unit 522, a menu switch 523, and a shutter button 524, for example. The display unit 522 is the display device according to the above embodiments. As illustrated in FIG. 27, the digital camera includes a lens cover 525, and slides the lens cover 525 to expose an image-capturing lens. A digital camera can image light incident from its image-capturing lens to capture a digital photograph.

Application Example 3

Figure 29:
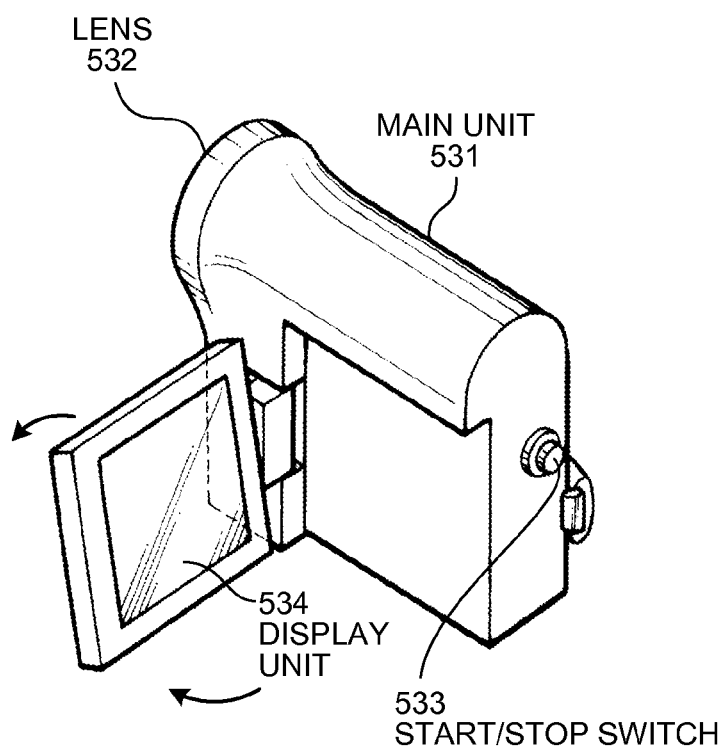
FIG. 29 is a perspective view illustrating an example of an electronic apparatus to which the display device according to the above embodiments is applied.

An electronic apparatus illustrated in FIG. 29 is a video camera to which the display device 1 according to the above embodiments is applied, and FIG. 29 illustrates its external appearance. This video camera includes a main unit 531, a subject capturing lens 532 that is provided on the front side of the main unit 531, an image-capturing start/stop switch 533, and a display unit 534, for example. The display unit 534 is the display device according to the above embodiments.

Application Example 4

Figure 30:
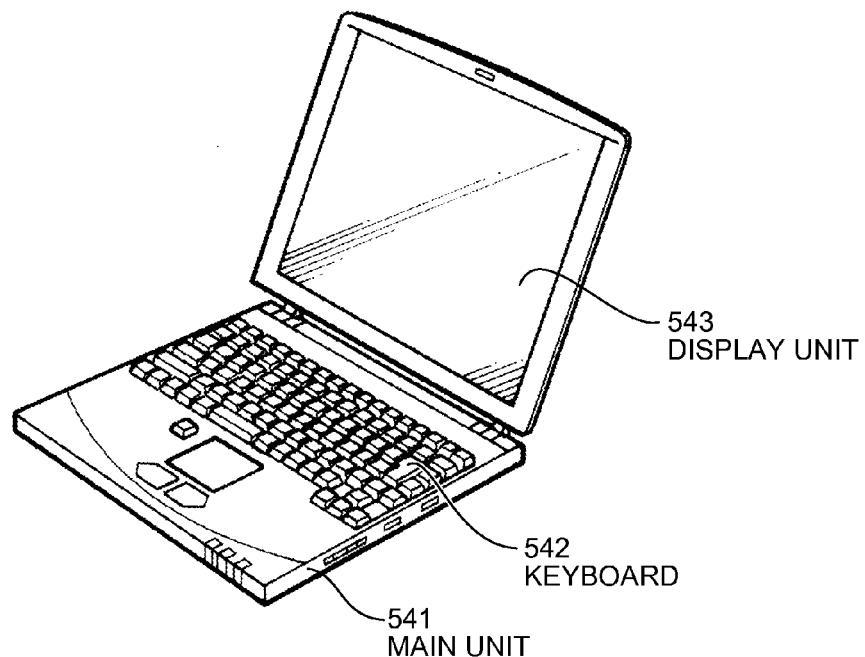
FIG. 30 is a perspective view illustrating an example of an electronic apparatus to which the display device according to the above embodiments is applied.
Figure 31:
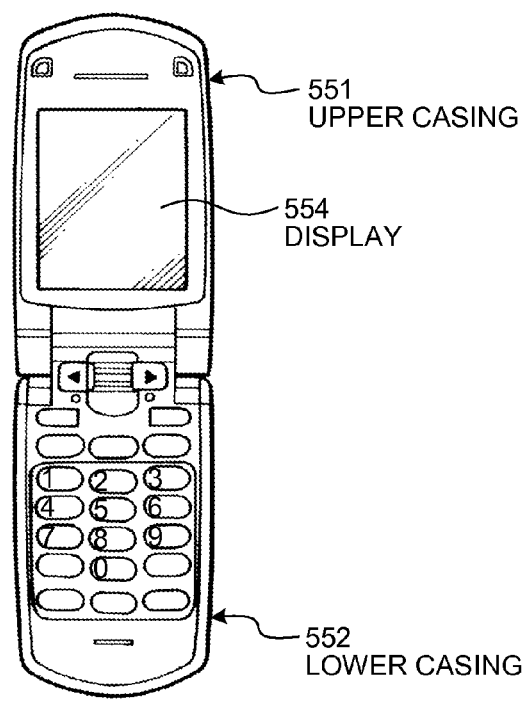
FIG. 31 is an open front view illustrating an example of an electronic apparatus to which the display device according to the above embodiments is applied.
Figure 32:
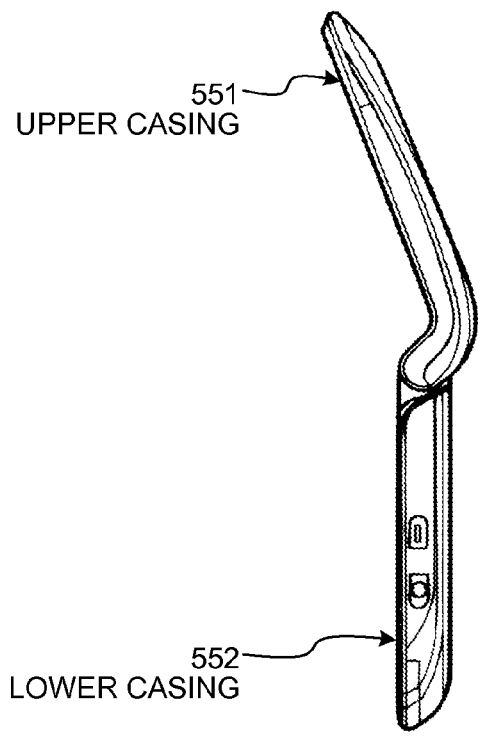
FIG. 32 is an open side view illustrating an example of an electronic apparatus to which the display device according to the above embodiments is applied.
Figure 33:
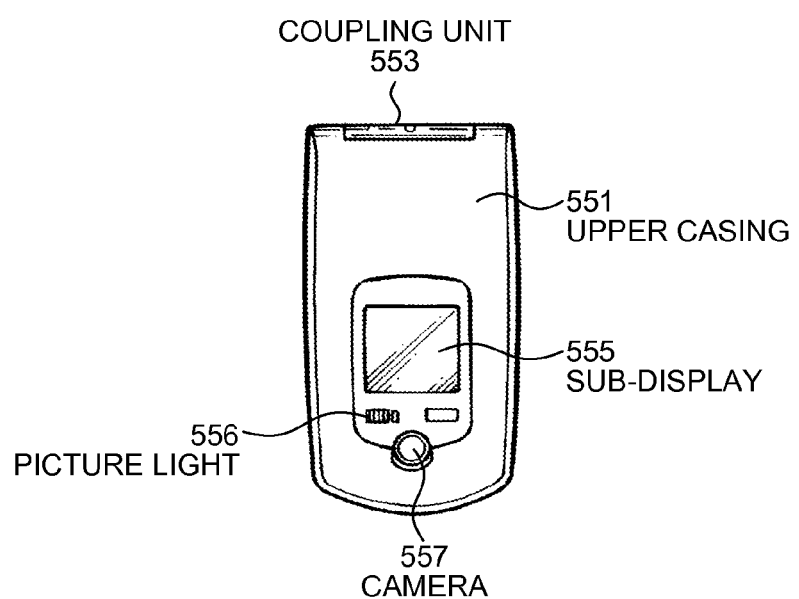
FIG. 33 is a closed front view illustrating an example of an electronic apparatus to which the display device according to the above embodiments is applied.
Figure 34:
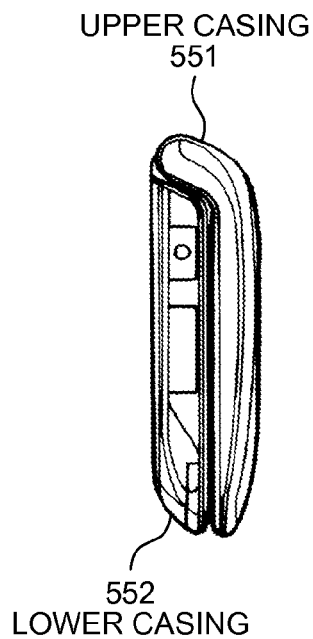
FIG. 34 is a closed side view illustrating an example of an electronic apparatus to which the display device according to the above embodiments is applied.
Figure 35:
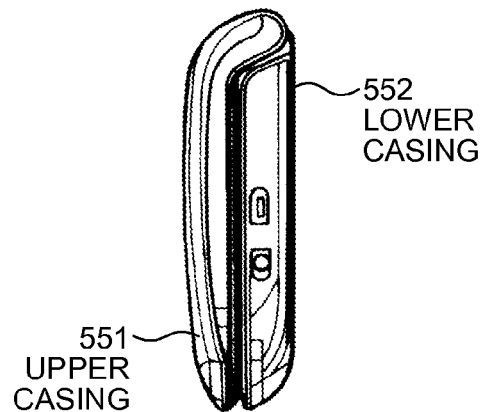
FIG. 35 is a closed side view illustrating an example of an electronic apparatus to which the display device according to the above embodiments is applied.
Figure 36:
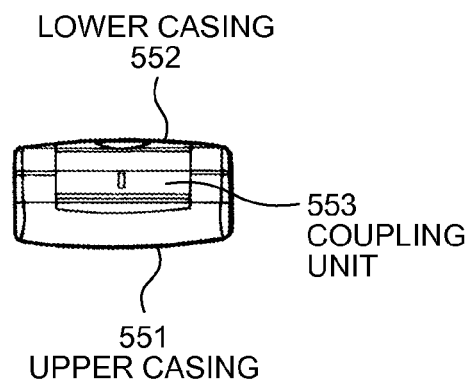
FIG. 36 is a closed top view illustrating an example of an electronic apparatus to which the display device according to the above embodiments is applied.
Figure 37:
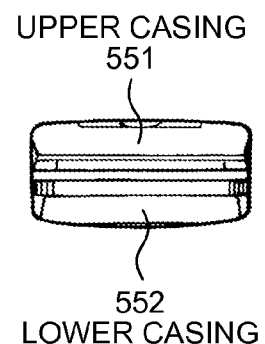
FIG. 37 is a closed bottom view illustrating an example of an electronic apparatus to which the display device according to the above embodiments is applied.

An electronic apparatus illustrated in FIG. 30 is a laptop personal computer to which the display device 1 according to the above embodiments is applied. This laptop personal computer includes a main unit 541, a keyboard 542 for an operation to input text and the like, and a display unit 543 that displays an image. The display unit 543 is configured by the display device according to the above embodiments.

Application Example 5

An electronic apparatus illustrated in FIGS. 31 to 37 is a portable phone to which the display device 1 according to the above embodiments is applied. This portable phone is configured by coupling an upper casing 551 and a lower casing 552 by a coupling unit (a hinge) 553, and includes a display 554, a sub-display 555, a picture light 556, and a camera 557. The display 554 or the sub-display 555 is configured by the display device according to the above embodiments.

Application Example 6

Figure 38:
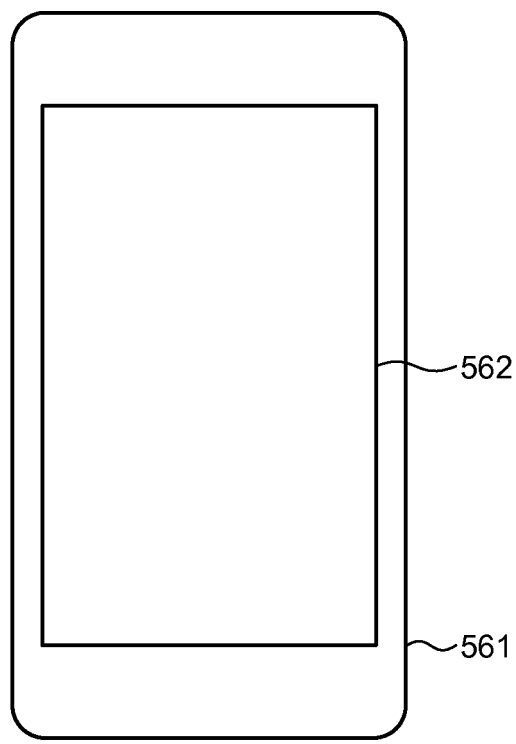
FIG. 38 is a front view illustrating an example of an electronic apparatus to which the display device according to the above embodiments is applied.

An electronic apparatus illustrated in FIG. 38 is a portable information terminal that operates as a portable computer, a multi-functional portable phone, a portable computer capable of making a voice call, or a portable computer capable of other forms of communication, and that is also referred to as so-called "smart phone" or "tablet terminal". This portable information terminal includes a display unit 562 on a surface of a casing 561, for example. The display unit 562 is the display device according to the above embodiments.

According to the display device and the electronic apparatus disclosed herein, crosstalk between images can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present disclosure can employ the following configurations.

3. Configuration of Present Disclosure (1) A display device for displaying a first image in a first direction and a second image in a second direction different from the first direction, the display device comprising:
 a display panel having a plurality of pixels arrayed in a matrix, the plurality of pixels including a first pixel which is any one of pixels, a second pixel adjacent to the first pixel, a third pixel adjacent to the first pixel opposite from the second pixel, and a fourth pixel adjacent to the second pixel opposite from the first pixel;
 a backlight configured to emit a light to a back surface of the display panel; and
 a parallax barrier made of a light shielding material and formed on a front surface of the first pixel and the second pixel, the parallax barrier including an opening having no light shielding material at a boundary portion between the first pixel and the second pixel, the parallax barrier configured so that a light from the first pixel passes through the opening of the parallax barrier and is emitted to the first direction, and a light from the second pixel passes through the opening of the parallax barrier and is emitted to the second direction, wherein
 at least part of a light emitted from the backlight and entered the boundary portion between the first pixel and the second pixel passes through the opening of the parallax barrier,
 at least part of a light emitted from the backlight and entered a boundary portion between the first pixel and the third pixel passes through the opening of the parallax barrier, and
 at least part of a light emitted from the backlight and entered a boundary portion between the second and the fourth pixel passes through the opening of the parallax barrier,
 so that a luminance of the first image when the first image and the second image are black images is increased to satisfy a following formula (1)

$$(B-A)/A \le 1 \qquad \text{Formula (1)}$$

wherein A represents the luminance of the first image when the first image and the second image are black images, and B represents a luminance of the first image when the first image is a black image and the second image is a white image.

(2) The display device according to (1), further comprising:
 a first black matrix made of a light shielding material and formed in a layer nearer to the backlight than the parallax barrier so that the black matrix bridges over the first pixel and the second pixel;
 a second black matrix made of a light shielding material and formed in a layer nearer to the backlight than the parallax barrier so that the black matrix bridges over the first pixel and the third pixel; and
 a third black matrix made of a light shielding material and formed in a layer nearer to the backlight than the parallax barrier so that the black matrix bridges over the second pixel and the fourth pixel, wherein
 the first black matrix includes a second opening which is an opening having no light shielding material and through which at least part of the light emitted from the backlight and entered the boundary portion between the first pixel and the second pixel passes through,
 the second black matrix includes a third opening which is an opening having no light shielding material and through which at least part of the light emitted from the backlight and entered the boundary portion between the first pixel and the third pixel passes through, and
 the third black matrix includes a fourth opening which is an opening having no light shielding material and through which at least part of the light emitted from the backlight and entered the boundary portion between the second pixel and the fourth pixel passes through.

(3) The display device according to (2),
 the second opening includes a plurality of openings formed along an edge direction of the first pixel and the second pixel,
 the third opening includes a plurality of openings formed along an edge direction of the first pixel and the third pixel, and
 the fourth opening includes a plurality of openings formed along an edge direction of the second pixel and the fourth pixel.

(4) The display device according to (2),
 the first pixel and the second pixel are formed without a color filter in at least part of the boundary portion between the first pixel and the second pixel,
 the first pixel and the third pixel are formed without a color filter in at least part of the boundary portion between the first pixel and the third pixel, and
 the second pixel and the fourth pixel are formed without a color filter in at least part of the boundary portion between the second pixel and the fourth pixel.

(5) The display device according to (1), further comprising:
 a first black matrix formed in a layer nearer to the backlight than the parallax barrier so that the first black matrix bridges over the first pixel and the second pixel;
 a second black matrix formed in a layer nearer to the backlight than the parallax barrier so that the second black matrix bridges over the first pixel and the third pixel; and a third black matrix formed in a layer nearer to the backlight than the parallax barrier so that the third black matrix bridges over the second pixel and the fourth pixel, the first black matrix is made of a material to transmit at least part of the light emitted from the backlight and entered the boundary portion between the first pixel and the second pixel, the second black matrix is made of a material to transmit at least part of the light emitted from the backlight and entered the boundary portion between the first pixel and the third pixel, and the third black matrix is made of a material to transmit at least part of the light emitted from the backlight and entered the boundary portion between the second pixel and the fourth pixel.

(6) The display device according to (5), the first pixel and the second pixel are formed without a color filter in at least part of the boundary portion between the first pixel and the second pixel, the first pixel and the third pixel are formed without a color filter in at least part of the boundary portion between the first pixel and the third pixel, and the second pixel and the fourth pixel are formed without a color filter in at least part of the boundary portion between the second pixel and the fourth pixel.

(7) The display device according to (1), the display panel is a normally black liquid crystal display panel which displays a black color when no electric voltage is applied.

(8) The display device according to (6), wherein the first pixel and the second pixel are formed without a color filter in at least part of the boundary portion between the first pixel and the second pixel, the first pixel and the third pixel are formed without a color filter in at least part of the boundary portion between the first pixel and the third pixel, and the second pixel and the fourth pixel are formed without a color filter in at least part of the boundary portion between the second pixel and the fourth pixel.

(9) An electronic apparatus comprising:

a display device for displaying a first image in a first direction and a second image in a second direction different from the first direction; and a control unit to supply an input signal to the display device, wherein the display device includes a display panel having a plurality of pixels arrayed in a matrix, the plurality of pixels including a first pixel which is any one of pixels, a second pixel adjacent to the first pixel, a third pixel adjacent to the first pixel opposite from the second pixel, and a fourth pixel adjacent to the second pixel opposite from the first pixel;

a backlight configured to emit a light to a back surface of the display panel; and a parallax barrier made of a light shielding material and formed on a front surface of the first pixel and the second pixel, the parallax barrier including an opening having no light shielding material at a boundary portion between the first pixel and the second pixel, the parallax barrier configured so that a light from the first pixel passes through the opening of the parallax barrier and is emitted to the first direction, and a light from the second pixel passes through the opening of the parallax barrier and is emitted to the second direction, wherein at least part of a light emitted from the backlight and entered the boundary portion between the first pixel and the second pixel passes through the opening of the parallax barrier, at least part of a light emitted from the backlight and entered a boundary portion between the first pixel and the third pixel passes through the opening of the parallax barrier, and at least part of a light emitted from the backlight and entered a boundary portion between the second and the fourth pixel passes through the opening of the parallax barrier, so that a luminance of the first image when the first image and the second image are black images is increased to satisfy a following formula (1)

$$(B-A)/A \leq 1 \qquad \text{Formula (1)}$$

wherein A represents the luminance of the first image when the first image and the second image are black images, and B represents a luminance of the first image when the first image is a black image and the second image is a white image.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device for displaying a first image in a first direction and a second image in a second direction different from the first direction, the display device comprising:

a display panel having a plurality of pixels arrayed in a matrix, the plurality of pixels including a first pixel which is any one of pixels, a second pixel adjacent to the first pixel, a third pixel adjacent to the first pixel opposite from the second pixel, and a fourth pixel adjacent to the second pixel opposite from the first pixel;

a backlight configured to emit a light to a back surface of the display panel; and a parallax barrier made of a light shielding material and formed on a front surface of the first pixel and the second pixel, the parallax barrier including an opening having no light shielding material at a boundary portion between the first pixel and the second pixel, the parallax barrier configured so that a light from the first pixel passes through the opening of the parallax barrier and is emitted to the first direction, and a light from the second pixel passes through the opening of the parallax barrier and is emitted to the second direction, at least part of a light emitted from the backlight and entered the boundary portion between the first pixel and the second pixel passes through the opening of the parallax barrier, at least part of a light emitted from the backlight and entered a boundary portion between the first pixel and the third pixel passes through the opening of the parallax barrier, and at least part of a light emitted from the backlight and entered a boundary portion between the second and the fourth pixel passes through the opening of the parallax barrier, so that a luminance of the first image when the first image and the second image are black images is increased to satisfy a following formula (1)

$$(B-A)/A \leq 1 \qquad \text{Formula (1)}$$

wherein A represents the luminance of the first image when the first image and the second image are black images, and B represents a luminance of the first image when the first image is a black image and the second image is a white image.

2. The display device according to claim 1, further comprising:
   a first black matrix made of a light shielding material and formed in a layer nearer to the backlight than the parallax barrier so that the black matrix bridges over the first pixel and the second pixel;
   a second black matrix made of a light shielding material and formed in a layer nearer to the backlight than the parallax barrier so that the black matrix bridges over the first pixel and the third pixel; and
   a third black matrix made of a light shielding material and formed in a layer nearer to the backlight than the parallax barrier so that the black matrix bridges over the second pixel and the fourth pixel, wherein
   the first black matrix includes a second opening which is an opening having no light shielding material and through which at least part of the light emitted from the backlight and entered the boundary portion between the first pixel and the second pixel passes through,
   the second black matrix includes a third opening which is an opening having no light shielding material and through which at least part of the light emitted from the backlight and entered the boundary portion between the first pixel and the third pixel passes through, and
   the third black matrix includes a fourth opening which is an opening having no light shielding material and through which at least part of the light emitted from the backlight and entered the boundary portion between the second pixel and the fourth pixel passes through.

3. The display device according to claim 2,
   the second opening includes a plurality of openings formed along an edge direction of the first pixel and the second pixel,
   the third opening includes a plurality of openings formed along an edge direction of the first pixel and the third pixel, and
   the fourth opening includes a plurality of openings formed along an edge direction of the second pixel and the fourth pixel.

4. The display device according to claim 2,
   the first pixel and the second pixel are formed without a color filter in at least part of the boundary portion between the first pixel and the second pixel,
   the first pixel and the third pixel are formed without a color filter in at least part of the boundary portion between the first pixel and the third pixel, and
   the second pixel and the fourth pixel are formed without a color filter in at least part of the boundary portion between the second pixel and the fourth pixel.

5. The display device according to claim 1, further comprising:
   a first black matrix formed in a layer nearer to the backlight than the parallax barrier so that the first black matrix bridges over the first pixel and the second pixel;
   a second black matrix formed in a layer nearer to the backlight than the parallax barrier so that the second black matrix bridges over the first pixel and the third pixel; and
   a third black matrix formed in a layer nearer to the backlight than the parallax barrier so that the third black matrix bridges over the second pixel and the fourth pixel,
   the first black matrix is made of a material to transmit at least part of the light emitted from the backlight and entered the boundary portion between the first pixel and the second pixel,
   the second black matrix is made of a material to transmit at least part of the light emitted from the backlight and entered the boundary portion between the first pixel and the third pixel, and
   the third black matrix is made of a material to transmit at least part of the light emitted from the backlight and entered the boundary portion between the second pixel and the fourth pixel.

6. The display device according to claim 5, wherein
   the first pixel and the second pixel are formed without a color filter in at least part of the boundary portion between the first pixel and the second pixel,
   the first pixel and the third pixel are formed without a color filter in at least part of the boundary portion between the first pixel and the third pixel, and
   the second pixel and the fourth pixel are formed without a color filter in at least part of the boundary portion between the second pixel and the fourth pixel.

7. The display device according to claim 1,
   the display panel is a normally black liquid crystal display panel which displays a black color when no electric voltage is applied.

8. The display device according to claim 7,
   the first pixel and the second pixel are formed without a color filter in at least part of the boundary portion between the first pixel and the second pixel,
   the first pixel and the third pixel are formed without a color filter in at least part of the boundary portion between the first pixel and the third pixel, and
   the second pixel and the fourth pixel are formed without a color filter in at least part of the boundary portion between the second pixel and the fourth pixel.

9. An electronic apparatus comprising:
   a display device for displaying a first image in a first direction and a second image in a second direction different from the first direction; and
   a control unit to supply an input signal to the display device,
   the display device includes
   a display panel having a plurality of pixels arrayed in a matrix, the plurality of pixels including a first pixel which is any one of pixels, a second pixel adjacent to the first pixel, a third pixel adjacent to the first pixel opposite from the second pixel, and a fourth pixel adjacent to the second pixel opposite from the first pixel;
   a backlight configured to emit a light to a back surface of the display panel; and
   a parallax barrier made of a light shielding material and formed on a front surface of the first pixel and the second pixel, the parallax barrier including an opening having no light shielding material at a boundary portion between the first pixel and the second pixel, the parallax barrier configured so that a light from the first pixel passes through the opening of the parallax barrier and is emitted to the first direction, and a light from the second pixel passes through the opening of the parallax barrier and is emitted to the second direction,
   at least part of a light emitted from the backlight and entered the boundary portion between the first pixel and the second pixel passes through the opening of the parallax barrier, at least part of a light emitted from the backlight and entered a boundary portion between the first pixel and the third pixel passes through the opening of the parallax barrier, and at least part of a light emitted from the backlight and entered a boundary portion between the second and the fourth pixel passes through the opening of the parallax barrier, so that a luminance of the first image when the first image and the second image are black images is increased to satisfy a following formula (1)

$$(B-A)/A \leq 1 \qquad \text{Formula (1)}$$

wherein A represents the luminance of the first image when the first image and the second image are black images, and B represents a luminance of the first image when the first image is a black image and the second image is a white image.

* * * * *